United States Patent
Oda et al.

(10) Patent No.: US 12,152,996 B2
(45) Date of Patent: Nov. 26, 2024

(54) INSPECTION DEVICE, BLISTER PACKING MACHINE, AND METHOD OF MANUFACTURING BLISTER PACK

(71) Applicant: CKD CORPORATION, Aichi (JP)

(72) Inventors: Shozo Oda, Aichi (JP); Yukihiro Taguchi, Aichi (JP); Eiji Ohta, Aichi (JP)

(73) Assignee: CKD CORPORATION, Aichi (JP)

( * ) Notice: Subject to any disclaimer, the term of this patent is extended or adjusted under 35 U.S.C. 154(b) by 79 days.

(21) Appl. No.: 18/164,221

(22) Filed: Feb. 3, 2023

(65) Prior Publication Data
US 2023/0184692 A1 Jun. 15, 2023

Related U.S. Application Data

(63) Continuation of application No. PCT/JP2021/020955, filed on Jun. 2, 2021.

(30) Foreign Application Priority Data

Aug. 4, 2020 (JP) .................................. 2020-132478

(51) Int. Cl.
*G01N 21/95* (2006.01)
*B65B 11/52* (2006.01)
(Continued)

(52) U.S. Cl.
CPC .............. *G01N 21/95* (2013.01); *B65B 11/52* (2013.01); *B65B 57/02* (2013.01); *G06T 7/001* (2013.01);
(Continued)

(58) Field of Classification Search
CPC . G06T 2207/20081; G06T 2207/20084; G06T 7/001; G01N 2021/8883;
(Continued)

(56) References Cited

U.S. PATENT DOCUMENTS

2020/0172279 A1* 6/2020 Taguchi .................. B29C 51/10

FOREIGN PATENT DOCUMENTS

| JP | 6368408 | B1 | | 8/2018 | |
| JP | 2019031302 | A | | 2/2019 | |
| KR | 101911061 | B1 | * | 10/2018 | ......... G01N 21/8851 |

OTHER PUBLICATIONS

International Search Report issued in corresponding International Application No. PCT/JP2021/020955, dated Aug. 24, 2021, with translation (6 pages).

(Continued)

*Primary Examiner* — William C Vaughn, Jr.
*Assistant Examiner* — Astewaye Gettu Zewede
(74) *Attorney, Agent, or Firm* — Osha Bergman Watanabe & Burton LLP

(57) ABSTRACT

An inspection device inspects a formation state of a pocket portion formed in a container film of a blister pack and includes: an illumination device that irradiates a container film including the pocket portion with a predetermined electromagnetic wave; an imaging device that takes an image of at least the electromagnetic wave transmitted through a bottom portion of the pocket portion and obtains image data; a control device that extracts, based on the image data, shading pattern data corresponding to a shading pattern occurring in the bottom portion of the pocket portion by irradiation with the electromagnetic wave; a storage that stores a neural network and a model, the model being generated by learning of the neural network using, as learning data, only shading pattern data of a pocket portion without any formation defect among the extracted shading pattern data.

17 Claims, 13 Drawing Sheets

(51) Int. Cl.
  *B65B 57/02*   (2006.01)
  *G06T 7/00*    (2017.01)
  *H04N 23/56*   (2023.01)
(52) U.S. Cl.
  CPC ... *H04N 23/56* (2023.01); *G06T 2207/20081* (2013.01); *G06T 2207/20084* (2013.01)
(58) Field of Classification Search
  CPC .... G01N 21/95; G01N 21/9508; B65B 11/52; B65B 57/02; B65B 9/04; H04N 23/56
  See application file for complete search history.

(56)  References Cited

OTHER PUBLICATIONS

International Preliminary Report on Patentability issued in corresponding International Application No. PCT/JP2021/020955, issued Feb. 7, 2023, with translation (12 pages).

\* cited by examiner

INSPECTION DEVICE, BLISTER PACKING MACHINE, AND METHOD OF MANUFACTURING BLISTER PACK

BACKGROUND

Technical Field

The present disclosure relates to an inspection device configured to perform an inspection for the formation state of a pocket portion of a blister pack, a blister packing machine and a method of manufacturing the blister pack.

Description of Related Art

Blister packs have widely been used as packing containers to package, for example, medicinal products, food stuff, and electronic components. An especially known blister pack in the field of medicinal products is a PTP (press through package) sheet used to package tablets, capsules or the like. The PTP sheet is comprised of a container film with a pocket portion formed therein to be filled with a content such as a tablet and a cover film mounted to the container film such as to seal an opening side of the pocket portion. The content is taken out by pressing the pocket portion from outside and causing the content placed in the pocket portion to break the cover film serving as a cover.

This PTP sheet is manufactured through, for example, a pocket portion forming process of forming a pocket portion in a container film in a belt-like form, a filling process of filling a content into the pocket portion; a mounting process of mounting a cover film to the container film such as to seal an opening side of the pocket portion, and a separation process of separating a PTP sheet as a final product from a PTP film in a belt-like form obtained by mounting the respective films in the belt-like form to each other.

A general procedure of forming the pocket portions stretches some part (a predetermined forming portion) of a partly heated and softened container film in a belt-like form: for example, vacuum forming, pressure forming, plug forming or plug assist pressure forming.

There is accordingly a correlation between the wall thickness of a bottom portion and the wall thickness of a side portion of the pocket portion, i.e., such a correlation that the thick bottom portion provides the thin side portion and that the thin bottom portion provides the thick side portion.

In the case of losing the balance between the wall thickness of the bottom portion and the wall thickness of the side portion, part of the pocket portion is made excessively thin. This is likely to cause reduction of the gas barrier property and the like. Especially the side portion that has the smaller wall thickness than the wall thickness of the bottom is likely to have excessive thinning.

One proposed technique takes advantage of the correlation described above to detect a formation defect in the side portion of the pocket portion, based on image data obtained by taking an image of the bottom portion of the pocket portion (as described in, for example, PTL 1).

PATENT LITERATURE

PTL 1: Japanese Patent No. 6368408B

The prior art technique described in PTL 1 is configured to calculate wall thicknesses at respective positions on the bottom portion according to a relationship between the transmittance of light and the wall thickness of the bottom portion, based on image data obtained by taking an image of the bottom portion of the pocket portion, and to detect a formation defect in the side portion of the pocket portion, on the basis of an average value of the calculated wall thicknesses (average wall thickness of the bottom portion).

The formation state of the side portion of the pocket portion is roughly estimable from the wall thicknesses of the bottom portion as described above. Even when an average value, a maximum value and a minimum value of the wall thickness of the bottom portion become desired values and the formation state of the bottom portion is determined to be appropriate, however, in the case of the bottom portion having an uneven wall thickness distribution or a complicated shape, the side portion may not have a desired wall thickness or may have an uneven wall thickness distribution.

The prior art configuration described above is thus likely to fail in accurate detection of a formation defect (wall thickness defect) in the side portion of the pocket portion.

The above issues are not limited to the field of PTP packaging but are also found in the field of other blister packaging.

SUMMARY

By taking into account the circumstances described above, one or more embodiments of the present disclosure provide an inspection device configured to detect a formation defect in a side portion of a pocket portion with the higher accuracy, a blister packing machine and a method of manufacturing a blister pack.

The following describes each of various aspects of the present disclosure. Functions and advantageous effects that are characteristic of each of the aspects are also described as appropriate.

Aspect 1. There is provided an inspection device configured to inspect a formation state of a pocket portion of a blister pack. The inspection device comprises an irradiation unit (i.e., an illumination device) configured to irradiate a container film with the pocket portion formed therein with a predetermined electromagnetic wave; an imaging unit (i.e., an imaging device) provided on an opposite side to the irradiation unit across the container film and configured to take an image of at least the electromagnetic wave transmitted through a bottom portion of the pocket portion and obtain image data; a shading pattern extraction unit (i.e., a control device) configured to extract shading pattern data corresponding to a shading pattern (shading distribution image) occurring in the bottom portion of the pocket portion by irradiation with the electromagnetic wave, based on the image data obtained by the imaging unit; a storage that stores a neural network and a model, wherein the model is generated by learning of a neural network using only shading pattern data of a pocket portion without any formation defect among the extracted shading pattern data, as learning data, the neural network has an encoding portion (encoder) that extracts a characteristic amount from input shading pattern data and a decoding portion (decoder) that reconstructs shading pattern data (creates reconstructed shading data) from the characteristic amount; a reconstructed data obtaining unit (i.e., the control device) configured to obtain the reconstructed shading pattern data, which is shading pattern data reconstructed by inputting the shading pattern data extracted by the shading pattern extraction unit, into the model; a comparison unit (i.e., the control device) configured to compare the shading pattern data extracted by the shading pattern extraction unit with the reconstructed shading pattern data obtained by the reconstructed data obtaining unit; and a good/poor quality judgment unit (i.e., the control device) configured to determine whether a quality of a formation state of at least a side portion of the pocket portion is good or poor, based on a result of comparison by the comparison unit.

The above "neural network" includes, for example, a convolutional neural network having a plurality of convolution layers. The above "learning" includes, for example, deep learning. The above "identification unit (generated model)" includes, for example, an autoencoder and a convolutional autoencoder. The same applies to the subsequent aspects.

The above "blister pack" includes, for example, a PTP sheet with tablets or the like placed therein, a portion pack with food stuff or the like placed therein, and a carrier tape with an electromagnetic component or the like placed therein. The above "electromagnetic wave" includes, for example, visible light, ultraviolet light, and X ray.

The expression of "shading pattern (shading distribution image) occurring in the bottom portion of the pocket portion by irradiation with the electromagnetic wave" described above means a two-dimensional distribution image of shading occurring in the bottom portion of the pocket portion, according to a relationship between a variation in wall thickness (wall thickness distribution) at respective positions (two-dimensional coordinate positions) on the bottom portion of the pocket portion and the transmittance or the like of the electromagnetic wave passing through the respective positions.

The term "shading" herein accordingly means a magnitude of intensity (luminance) of the electromagnetic wave passing through the respective positions on the bottom portion of the pocket portion. The above expression of "shading pattern (shading distribution image) occurring in the bottom portion of the pocket portion by irradiation with the electromagnetic wave" may thus be replaced by, for example, an expression of "an intensity distribution image of the electromagnetic wave passing through the bottom portion of the pocket portion", an expression of "a two-dimensional distribution image of electromagnetic wave intensity (luminance) that differs at respective positions on the bottom portion of the pocket portion due to a difference in wall thickness at the respective positions", or an expression of "a shading distribution image (electromagnetic wave intensity distribution image, luminance distribution image) corresponding to a wall thickness distribution in the bottom portion of the pocket portion".

As described above in "Background Art", there is a correlation between the wall thickness of the bottom portion and the wall thickness of the side portion of the pocket portion, which is formed by partly stretching the container film, i.e., such a correlation that the thick bottom portion provides the thin side portion and that the thin bottom portion provides the thick side portion.

Above Aspect 1 takes advantage of this correlation and is configured to extract a shading pattern occurring in the bottom portion of the pocket portion (i.e., a wall thickness distribution state of the bottom portion) from the image data that is obtained by taking an image of the bottom portion of the pocket portion irradiated with the predetermined electromagnetic wave and to perform good/poor quality judgement with regard to the formation state of at least the side portion of the pocket portion, based on the shading pattern.

This configuration allows for more accurate detection of a formation defect (wall thickness defect) in the side portion of the pocket portion, for example, an unevenness in the wall thickness distribution in the side portion of the pocket portion.

Especially, the configuration of this aspect uses the identification unit (the generated model), for example, an autoencoder, which is built by learning of the neural network, to perform an inspection with regard to the formation state of the side portion of the pocket portion.

More specifically, the configuration of this aspect compares the shading pattern data obtained by imaging of the bottom portion of the pocket portion that is an inspection object, with the reconstructed shading pattern data obtained by reconstruction of the shading pattern data by the identification unit.

This configuration enables an inspection to be performed, for example, with regard to even a subtle formation defect which the prior art configuration has difficulty in detection or with regard to the pocket portion including the bottom portion having a complicated shape or a complicated wall thickness distribution. As a result, this further enhances the inspection accuracy.

Furthermore, the two shading pattern data to be compared with each other in the configuration of this aspect are free from the effects due to differences in the imaging conditions on the container film side as the inspection object (for example, the arrangement position, the arrangement angle, and the deflection of the container film) and the imaging conditions on the inspection device side (for example, illumination conditions and the angle of view of a camera). This configuration accordingly enables a more subtle formation defect to be detected with the higher accuracy.

One employable configuration for an inspection with regard to the formation state of the side portion of the pocket portion directly takes and image of the side portion and performs the inspection. This configuration needs to detect the formation state of the entire circumference of the side portion by taking into account the gas barrier property and the other factors. Such detection of the formation state of the entire circumference of the side portion under the configuration of directly taking an image of the side portion, however, takes a long time and requires a large-scaled apparatus. This may lead to reduction in the productivity of the blister pack.

The configuration of this aspect, on the other hand, enables the formation state of the entire circumference of the side portion to be promptly and readily detected by simply imaging the bottom portion of the pocket portion and detecting the formation state of the bottom portion. This increases the speed of the inspection and thereby enhances the productivity of the blister pack.

Aspect 2. In the inspection device described in above Aspect 1, the container film may be made of a resin film material having translucency, and the irradiation unit may be configured to radiate ultraviolet light (for example, ultraviolet light having a peak wavelength in a range of not lower than 200 nm and not higher than 280 nm) as the electromagnetic wave.

In the case where the container film is made of the resin film material having translucency, a configuration of irradiation with visible light from the irradiation unit may fail to make a distinct difference in the transmittance of light between a thin wall location and a thick wall location in the bottom portion of the pocket portion. In other words, this configuration may provide the uniformity in the entire bottom portion and may fail to have a shading pattern. As a result, this may make it difficult to perform an inspection appropriately.

The configuration of above Aspect 2, on the other hand, irradiates the container film made of the resin film material having translucency, with ultraviolet light.

The ultraviolet light has the lower transmittance and the greater difficulty in transmission through the container film having translucency, compared with the visible light. This configuration accordingly enables an inspection with regard to the formation state of the pocket portion to be performed more appropriately.

The "resin film material having translucency" herein includes, for example, a "transparent resin film material" used to provide a film that has the property of light transmission (translucency), that has an extremely high transmittance of the electromagnetic wave (light), and that allows an opposite side to be seen through the film or a "translucent resin film material" used to provide a film that has translucency but that diffuses the electromagnetic wave (light) passing therethrough or has a low transmittance of the electromagnetic wave (light), and that does not cause the shape and the other conditions of a substance placed on an opposite side through the film to be distinctly recognizable with the naked eye or to be recognizable at all with the naked eye.

The terms "transparent" and "translucent" are expressions indicating the material of the film having translucency and are not related to the presence or the absence of color. Accordingly, a "transparent" or "translucent" film includes, for example, not only a "colorless transparent" or "colorless translucent" film but a "colored transparent" or "colored translucent" film.

Aspect 3. In the inspection device described in either of above Aspect 1 or above Aspect 2, the electromagnetic wave may include an electromagnetic wave having a wavelength that provides a transmittance of the container film (for example, a resin film material such as polypropylene or polyvinyl chloride) of not lower than 15 percent and not higher than 60 percent.

Both an excessively high transmittance and an excessively low transmittance of the electromagnetic wave transmitted through the container film make it difficult to cause a difference in the transmittance of light between a thin wall location and a thick wall location in the bottom portion of the pocket portion. As a result, this may make it difficult to perform an inspection appropriately.

Using the electromagnetic wave having the wavelength that provides the transmittance of the container film of not lower than 15 percent and not higher than 60 percent like the configuration of above Aspect 3, on the other hand, enables an inspection to be performed more appropriately. It is more preferable to perform an inspection by using an electromagnetic wave having a wavelength that provides the transmittance of the container film of not lower than 20 percent and not higher than 50 percent (for example, not higher than 30 percent).

Aspect 4. In the inspection device described in any one of above Aspects 1 to 3, the pocket portion may be thermally formed in the container film that is flat.

The term "thermally forming" herein means a forming method of partly heating, softening and stretching some part of the flat container film (predetermined forming portion) and includes, for example, vacuum forming, pressure forming, plug forming and plug assist pressure forming.

Accordingly, the functions and the advantageous effects of Aspect 1 and the other aspects described above are made more prominent under the configuration of above Aspect 4.

Aspect 5. There is provided a blister packing machine, comprising the inspection device described in any one of above Aspects 1 to 4.

Providing the inspection device described above in the blister packing machine (for example, a PTP packaging machine) like the configuration of above Aspect 5 has an advantage of, for example, efficiently removing defective products in a manufacturing process of blister packs (for example, PTP sheets). The blister packing machine may be provided with a discharge unit configured to discharge a blister pack determined as a defective product by the inspection device.

A more concrete configuration of the blister packing machine is, for example, a configuration described below.

"There is provided a blister packing machine configured to manufacture a blister pack, which has a predetermined content that is placed in a pocket portion formed in a container film and has a cover film that is mounted to close the pocket portion. The blister packing machine comprises a pocket portion forming unit configured to form the pocket portion in the container film conveyed in a belt-like form; a filling unit configured to fill the content into the pocket portion; a mounting unit configured to mount the cover film in a belt-like form to the container film with the pocket portion filled with the content, such as to close the pocket portion; a separation unit (including a punching unit configured to punch out in a sheet unit) configured to separate the blister pack from a belt-like body (a blister film in a belt-like form) obtained by mounting the cover film to the container film; and the inspection device described in any one of above Aspects 1 to 4."

An inspection of a container film of unstable posture requires a process of identifying the position of each pocket portion and, in the case of a non-circular pocket portion, additionally needs a process of calculating the center position of the pocket portion as an inspection object from image data, a process of adjusting the center of a reference image for pattern matching stored in advance to the calculated center position of the pocket portion, a process of rotating the reference image by every predetermined angle, and a process of determining whether the center of the reference image is placed at the calculated center position every time the reference image is rotated. The inspection with regard to the pocket portion accordingly requires a significantly large number of processes and is time- and labor-consuming.

Providing the inspection device on the blister packing machine like the configuration of above Aspect 5, on the other hand, fixes the stop position and the direction (posture) of the container film relative to the imaging unit. This configuration does not require position adjustment or direction adjustment of an inspection object in the course of an inspection and thereby increases the speed of the inspection. As a result, this configuration remarkably reduces the required number of processes involved in each pocket portion and thereby significantly increases the speed of the inspection process.

Furthermore, in the configuration of above Aspect 5, "the filling unit may be placed on a downstream side of the inspection device." The blister packing machine "may further comprise a filling control unit configured to control an operation of the filling unit based on a result of the inspection by the inspection device and to switch over between filling and non-filling of the content into the pocket portion."

This configuration allows the content not to be filled in, for example, a pocket portion having a formation defect. In the case of disposal of a blister pack due to the formation defect of the pocket portion, this configuration prevents the content from being wasted accompanied with the disposal of the blister pack. This configuration also does not require a troublesome operation of taking out the content once filled in the pocket portion for recycle of the content. As a result, this suppresses reduction of the productivity.

Furthermore, in the configuration of above Aspect 5, "the pocket portion forming unit may comprise a first mold, a second mold opposed to the first mold across the container film, and a stretch unit (stretch formation unit) configured to form the pocket portion in the container film placed between the first mold and the second mold."

In this configuration, there is a correlation between the wall thickness of the bottom portion and the wall thickness of the side portion of the pocket portion described above in "Background Art": i.e., such a correlation that the large wall thickness of the bottom portion provides the small wall thickness of the side portion and that the small wall thickness of the bottom portion provides the large wall thickness of the side portion. This enhances the functions and the advantageous effects of Aspect 1 and the other aspects described above, i.e., detection of a formation defect in the side portion of the pocket portion, based on image data obtained by taking an image of the bottom portion of the pocket portion.

Aspect 6. There is provided a method of manufacturing a blister pack, which has a predetermined content that is placed in a pocket portion formed in a belt-shaped container film and has a belt-shaped cover film that is mounted to close the pocket portion. The method of manufacturing the blister pack comprises a pocket portion forming process of forming the pocket portion in the container film; a filling process of filling the content into the pocket portion; a mounting process of mounting the cover film to the container film with the pocket portion filled with the content to close the pocket portion and obtaining a belt-shaped body; a separation process (including a punching process of punching out in a sheet unit) of separating the blister pack from the belt-shaped body (a blister film in a belt-like form) obtained by mounting the cover film to the container film; and an inspection process of inspecting a formation state of the pocket portion in the blister pack.

The inspection process comprises an irradiation process of irradiating the container film with the pocket portion formed therein with a predetermined electromagnetic wave; an imaging process of taking an image of at least the electromagnetic wave transmitted through a bottom portion of the pocket portion and obtaining image data; a shading pattern extraction process of extracting shading pattern data corresponding to a shading pattern (shading distribution image) occurring in the bottom portion of the pocket portion by irradiation with the electromagnetic wave, based on the image data obtained in the imaging process; a reconstructed data obtaining process of obtaining reconstructed shading pattern data, which is shading pattern data reconstructed by inputting the shading pattern data extracted in the shading pattern extraction process, into a model, wherein the model is generated by learning of a neural network using only shading pattern data of a pocket portion without any formation defect, as learning data, and the neural network has an encoding portion (encoder) that extracts a characteristic amount from input shading pattern data and a decoding portion (decoder) that reconstructs shading pattern data (creates the reconstructed shading pattern data) from the characteristic amount; a comparison process of comparing the shading pattern data extracted in the shading pattern extraction process with the reconstructed shading pattern data obtained in the reconstructed data obtaining process; and a good/poor quality determining process of determining whether a quality of a formation state of at least a side portion of the pocket portion is good or poor, based on a result of comparison in the comparison process.

The configuration of above Aspect 6 has similar functions and advantageous effects to those of Aspect 1 and Aspect 5 described above.

DETAILED DESCRIPTION OF EMBODIMENTS

The following describes embodiments with reference to drawings. A PTP sheet 1 as a blister package is described first.

Figure 1:
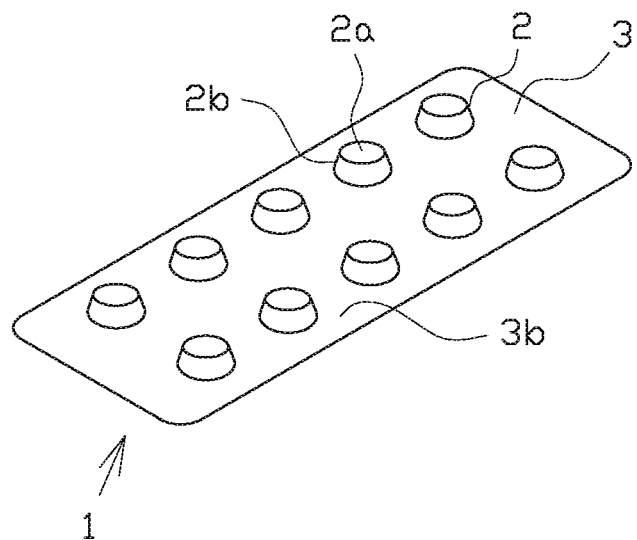
FIG. 1 is a perspective view illustrating a PTP sheet.
Figure 2:
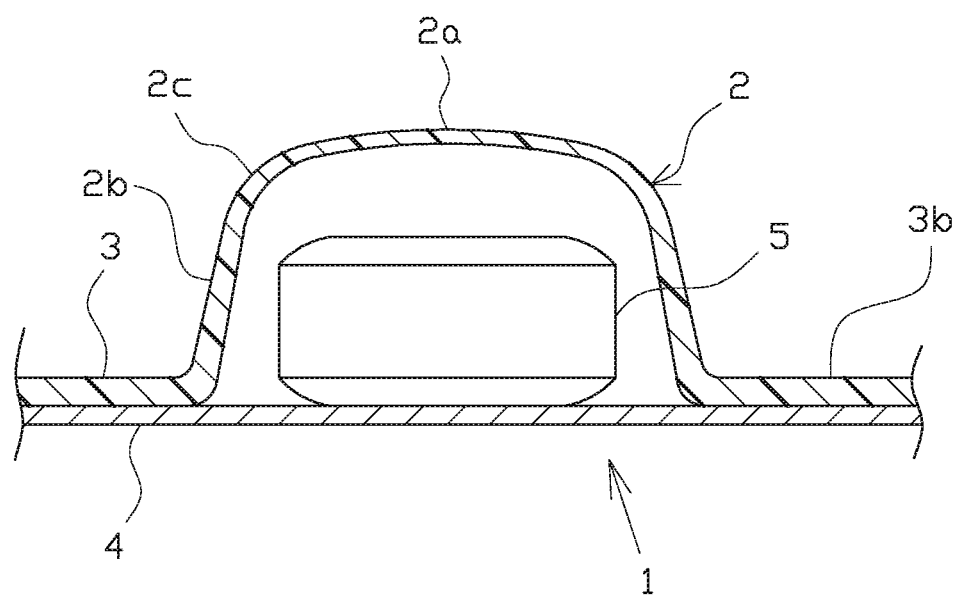
FIG. 2 is a partially enlarged sectional view illustrating the PTP sheet.

As shown in FIG. 1 and FIG. 2, the PTP sheet 1 includes a container film 3 provided with a plurality of pocket portions 2, and a cover film 4 mounted to the container film 3 such as to close the respective pocket portions 2.

The container film 3 is made of a colorless transparent thermoplastic resin material, such as PP (polypropylene) or PVC (polyvinyl chloride), and has translucency. The cover film 4 is, on the other hand, made of an opaque material (for example, aluminum foil) with a sealant made of, for example, a polypropylene resin, provided on a surface thereof.

The PTP sheet 1 is formed in an approximately rectangular shape in plan view. The PTP sheet 1 has two pocket portion arrays formed in a sheet short side direction, and each pocket portion array includes five pocket portions 2 arranged along a sheet longitudinal direction. Accordingly, a total of ten pocket portions 2 are formed in the PTP sheet 1. One tablet 5 as a content is placed in each of the pocket portions 2.

The pocket portion 2 is comprised of a bottom portion 2a formed in an approximately circular shape in plan view and arranged to be opposed to the cover film 4, and a side portion 2b formed in an approximately cylindrical shape to be connected with the periphery of the bottom portion 2a and to connect the bottom portion 2a with a film flat portion (non-pocket forming portion) 3b.

The bottom portion 2a according to one or more embodiments is formed to be gently curved and to have an approximately arc-shaped cross section. This configuration is, however, not essential. The bottom portion 2a may be formed flat. In another example, the bottom portion 2a may be formed to have an arc-shaped cross section of the larger curvature with an ambiguous and unclear corner portion 2c where the bottom portion 2a and the side portion 2b intersect.

Figure 3:
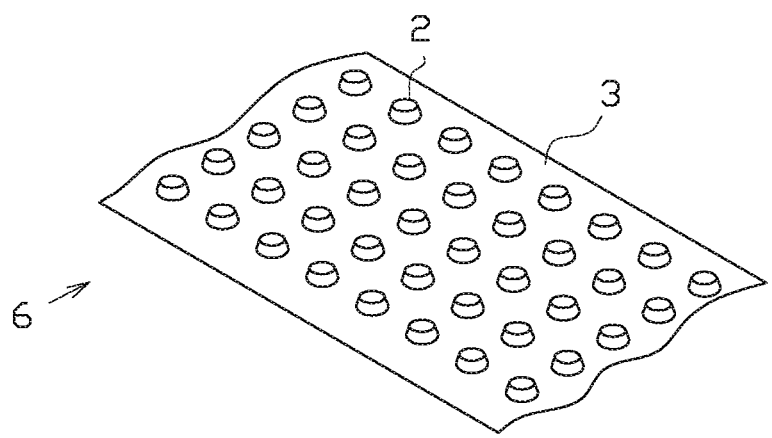
FIG. 3 is a perspective view illustrating a PTP film.

The PTP sheet 1 (shown in FIG. 1) is manufactured by punching out a rectangular sheet form from a belt-like PTP film 6 (shown in FIG. 3) comprised of a belt-like container film 3 and a belt-like cover film 4.

The following describes the schematic configuration of a PTP packaging machine 11 as a blister packing machine configured to manufacture the PTP sheet 1 described above, with reference to FIG. 5.

A film roll of the belt-like container film 3 is wound in a roll form on a most upstream side of the PTP packaging machine 11. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed along a conveyance path of the container film 3 between the guide roll 13 and the intermittent feed roll 14. The heating device 15 and the pocket portion forming device 16 configure the pocket portion forming unit according to one or more embodiments. The configuration of the heating device 15 and the pocket portion forming device 16 will be described later in detail.

In the state that the container film 3 is heated to be relatively soft by the heating device 15, a plurality of pocket portions 2 are formed simultaneously at predetermined positions of the container film 3 by the pocket portion forming device 16 (pocket portion forming process). Formation of the pocket portions 2 is performed during an interval between conveying operations of the container film 3 by the intermittent feed roll 14.

A pocket portion inspection device 21 is provided between the guide roll 13 and the intermittent feed roll 14 and downstream of the pocket portion forming device 16.

The pocket portion inspection device 21 serves to perform an inspection for the formation state of the pocket portions 2 formed by the pocket portion forming device 16 (inspection process). The configuration of the pocket portion inspection device 21 will be described later in detail.

The container film 3 fed from the intermittent feed roll 14 is sequentially laid on a tension roll 18, a guide roll 19 and a film receiving roll 20 in this order.

The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 22 is placed along the conveyance path of the container film 3 between the guide roll 19 and the film receiving roll 20.

The tablet filling device 22 serves as the filling unit to automatically fill the pocket portions 2 with the tablets 5. The tablet filling device 22 opens a shutter at every predetermined time interval to drop the tablet 5, in synchronization with the conveying operation of the container film 3 by the film receiving roll 20. Each of the pocket portions 2 is filled with the tablet 5 by this shutter opening operation (filling process). The operation of the tablet filling device 22 is controlled by a filling control device 82 described later.

A film roll of the cover film 4 formed in the belt-like shape is, on the other hand, wound in a roll form on a most upstream side. A pullout end of the cover film 4 wound in the roll form is guided by a guide roll 24 to a heating roll 25. The heating roll 25 is pressed against to be in contact with the film receiving roll 20. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations manufactures the PTP film 6 as a belt-like body that has the pocket portions 2 respectively filled with the tablets 5. The film receiving roll 20 and the heating roll 25 configure the mounting unit according to one or more embodiments.

The PTP film 6 fed from the film receiving roll 20 is sequentially laid on a tension roll 27 and an intermittent feed roll 28 in this order.

The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order.

The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form cutting slits at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order, downstream of the intermittent feed roll 32.

A sheet punching device 37 is placed along the conveyance path of the PTP film 6 between the intermittent feed roll 32 and the tension roll 35. The sheet punching device 37 serves as the sheet punching unit (separation unit) to punch out the outer periphery of each unit of PTP sheet 1 from the PTP film 6.

The respective PTP sheets 1 punched out by the sheet punching device 37 are conveyed by a take-out conveyor 38 and are temporarily accumulated in a finished product hopper 39 (separation process). In response to input of a defective signal from the filling control device 82 described later to a defective sheet discharge mechanism 40 that is configured to selectively discharge the PTP sheet 1, the PTP sheet 1 determined as a defective is separately discharged by the defective sheet discharge mechanism 40 and is transferred to a non-illustrated defective hopper.

A cutting device 41 is provided downstream of the continuous feed roll 36. A scrap part 42 remaining in a belt-like shape after punching out by the sheet punching device 37 is guided by the tension roll 35 and the continuous feed roll 36 and is then led to the cutting device 41. A driven roll is pressed against to be in contact with the continuous feed roll 36, so that the scrap part 42 is placed and conveyed between the driven roll and the continuous feed roll 36.

The cutting device 41 serves to cut the scrap part 42 into predetermined dimensions. The cut pieces of the scrap part 42 are accumulated in a scrap hopper 43 and are then disposed separately.

Each of the rolls, such as the rolls 14, 19, 20, 28, 31 and 32, described above is arranged in a positional relationship that the roll surface is opposed to the pocket portions 2. The surface of each roll, such as the surface of the roll 14, has recesses that are formed to place the pocket portions 2 therein. This configuration basically suppresses the pocket portions 2 from being crushed. The feeding operation with the pocket portions 2 placed in the respective recesses of each roll, such as the roll 14, achieves the reliable intermittent feed and continuous feed.

Figure 7:
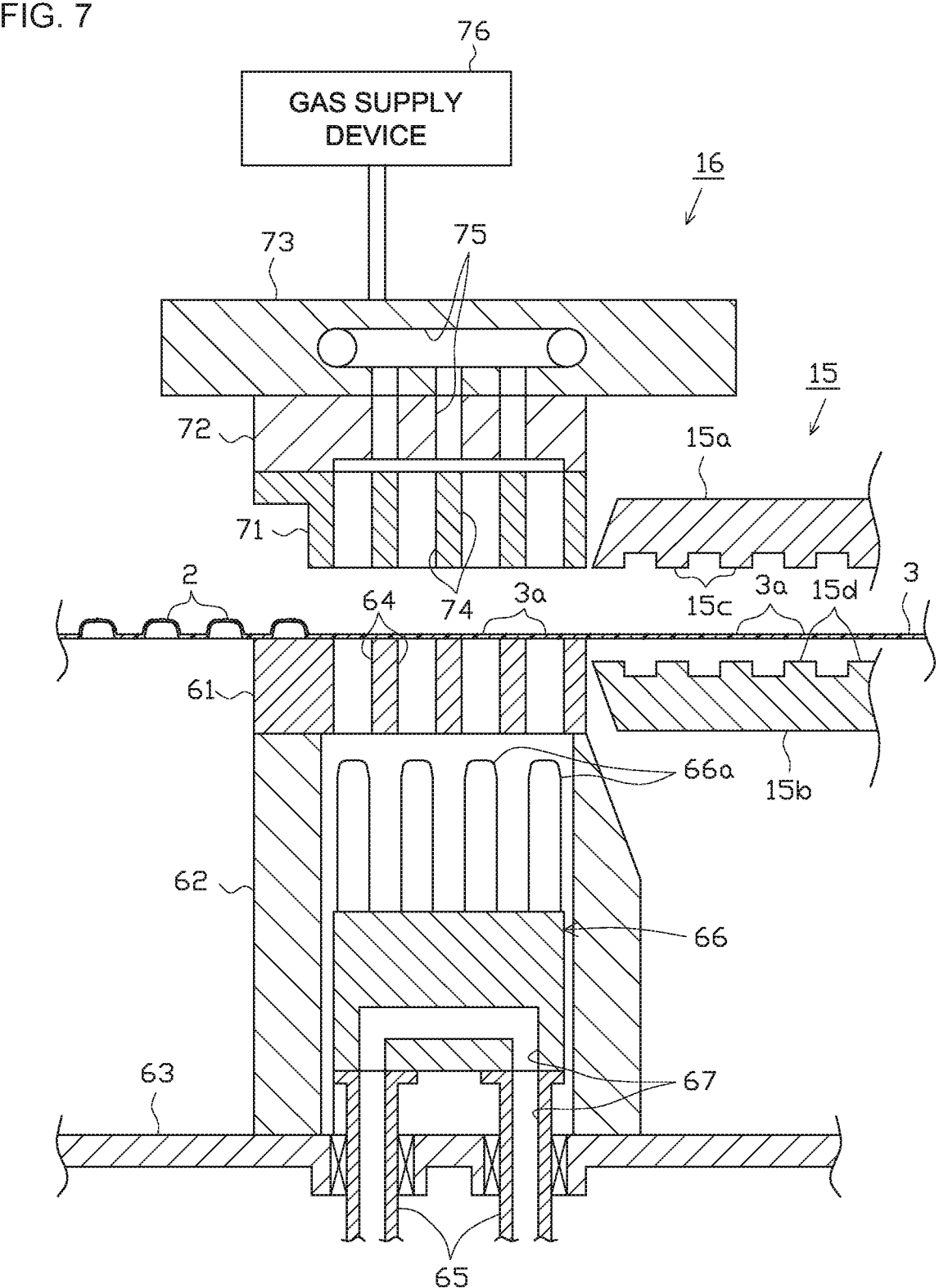
FIG. 7 is a partly broken front view illustrating the schematic configuration of a pocket portion forming device and a heating device.

The following describes the configuration of the heating device 15 and the pocket portion forming device 16 with reference to FIG. 7.

The heating device 15 includes an upper heater plate 15a and a lower heater plate 15b. Both the heater plates 15a and 15b are configured to be heated by a non-illustrated heater. The respective heater plates 15a and 15b are provided to be placed across the conveyance path of the container film 3 and are configured to be respectively movable in directions of becoming closer to or farther from the container film 3.

The heater plates 15a and 15b are respectively provided with a plurality of protrusions 15c and 15d at positions corresponding to predetermined forming portions 3a for forming the pocket portions 2 in the container film 3.

The intermittently conveyed container film 3 is placed between the protrusions 15c and 15d of the respectively approaching heater plates 15a and 15b during a temporary stop to be heated partially (at spots), so that the heated spots are softened. According to one or more embodiments, contact areas of the protrusions 15c and 15d that come into contact with the container film 3 are set to be slightly smaller than the planar shape of the pocket portions 2.

The pocket portion forming device 16 includes a lower mold 61 as a second mold and an upper mold 71 as a first mold. The lower mold 61 is fixed to a stationary support base 63 via a lower mold chamber 62 in a tubular form. The lower mold 61 is provided with a plurality of insertion holes 64 at positions corresponding to the positions of the pocket portions 2.

A plurality of through holes are formed in the support base 63, and rod-like sliders 65 are inserted into the through holes via a bearing mechanism. The sliders 65 are vertically movable by a non-illustrated cam mechanism.

A pocket portion forming mold 66 is fixed to upper portions of the sliders 65 and is provided with a plurality of plugs 66a configured to be inserted into the insertion holes 64 and formed in a rod-like shape to be extended in a vertical direction. The plug 66a has a leading end formed in such a shape that corresponds to the shape of an inner face of the pocket portion 2. The pocket portion forming mold 66 is moved up and down, accompanied with vertical motions of the sliders 65 by actuation of the cam mechanism. The lower mold 61, the pocket portion forming mold 66 and the like are appropriately replaceable according to the type of the PTP sheet 1 to be manufactured.

Furthermore, a circulation path 67 is formed inside of the sliders 65 and the pocket portion forming mold 66 to circulate cooling water (or warm water). This configuration suppresses a variation in the surface temperature at the respective plugs 66a.

The plugs 66a are sequentially placed at an initial position, at a middle stop position and at a protrusion position in this order in the course of formation of the pocket portions 2 and are eventually returned to the initial position. These operations of the plugs 66a are controlled by a formation control device 81 described later.

The initial position is a position where the plugs 66a are placed at a start of a process of forming the pocket portions 2. The plugs 66a placed at this position are located below and outside of the insertion holes 64.

The middle stop position is a position where the plugs 66a are placed in an intermediate stage of the process of forming the pocket portions 2. The plugs 66a placed at this position are located inside of the insertion holes 64, such that predetermined clearances are formed between the container film 3 and the plugs 66a.

The protrusion position is a position where the plugs 66a are placed in a last stage of the process of forming the pocket portions 2. Leading end faces of the plugs 66a placed at this position are protruded from the lower mold 61 by a length corresponding to the depth of the pocket portions 2.

The upper mold 71 is, on the other hand, fixed to a vertically movable upper plate 73 via a plate 72 and is configured to be movable along the directions of becoming closer to or farther from the lower mold 61. The upper mold 71 has gas supply holes 74 at positions opposed to the insertion holes 64 of the lower mold 61.

Furthermore, a gas supply path 75 communicating with the gas supply holes 74 is formed inside of the plate 72 and the upper plate 73. A predetermined high-pressure gas (an inert gas, the air according to one or more embodiments) is supplied from a gas supply device 76 configured by, for example, a compressor, to the gas supply path 75.

According to one or more embodiments, the pocket portion forming device 16 is configured to simultaneously form a total of twenty pocket portions 2 corresponding to two PTP sheets 1 by one operation. More specifically, the pocket portion forming device 16 is configured to simultaneously form five pocket portions in a film width direction of the container film 3 (Y direction) and four pocket portions in a film conveyance direction (X direction).

The formation control device 81 is described here. The formation control device 81 serves to perform controls relating to formation of the pocket portions 2 by the heating device 15 and the pocket portion forming device 16 and is configured by a computer system including, for example, a CPU and a RAM.

For example, information with regard to the initial position of the plugs 66a of the pocket portion forming device 16, information with regard to the middle stop position of the plugs 66a and information with regard to the protrusion position of the plugs 66a are set and stored in the formation control device 81. The formation control device 81 controls the operations of the plugs 66a, based on these pieces of information. The pieces of information with regard to the initial position, the middle stop position and the protrusion position of the plugs 66a are appropriately changed according to, for example, the depth of the pocket portions 2 in the PTP sheet 1 that is an object to be manufactured.

Figure 4:
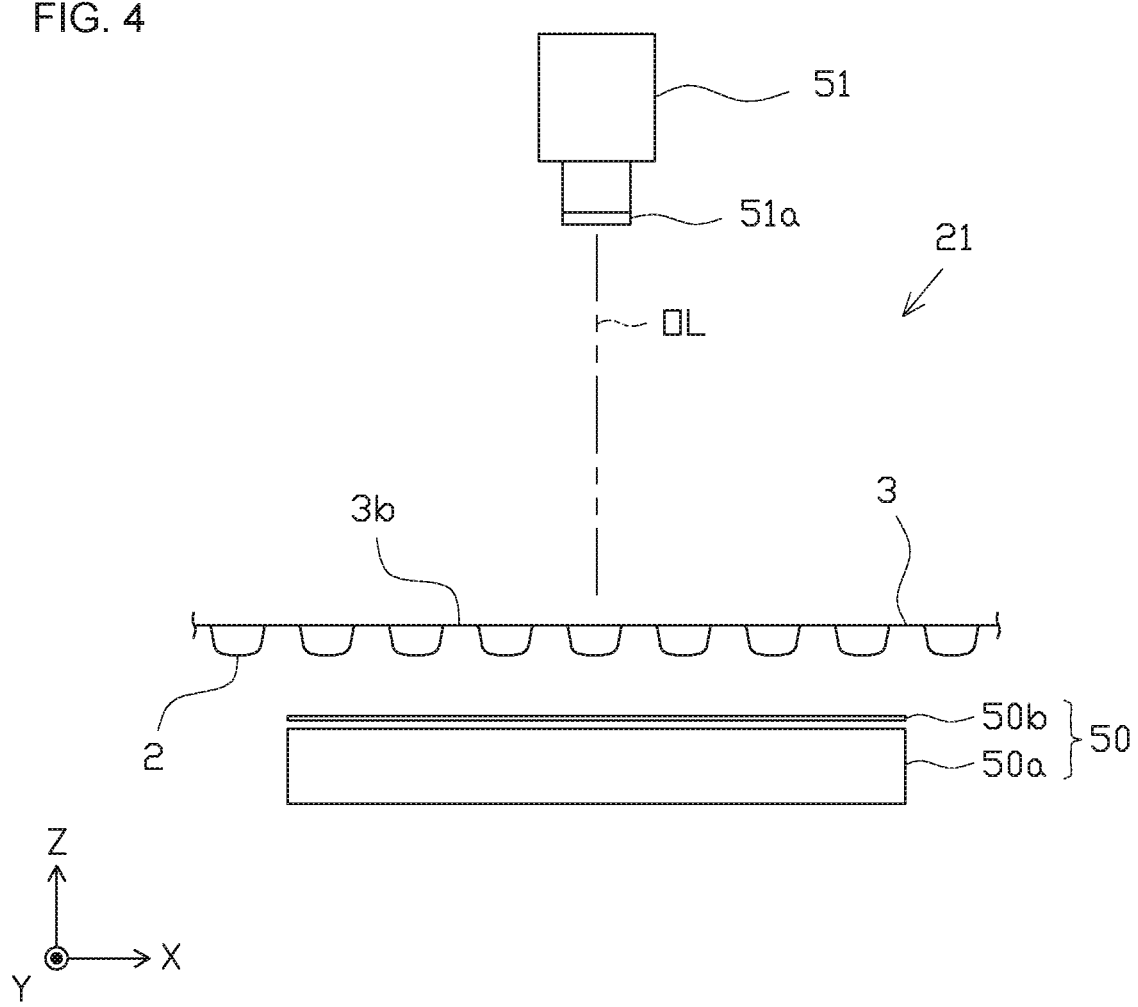
FIG. 4 is a schematic configuration diagram illustrating a pocket portion inspection device.
Figure 5:
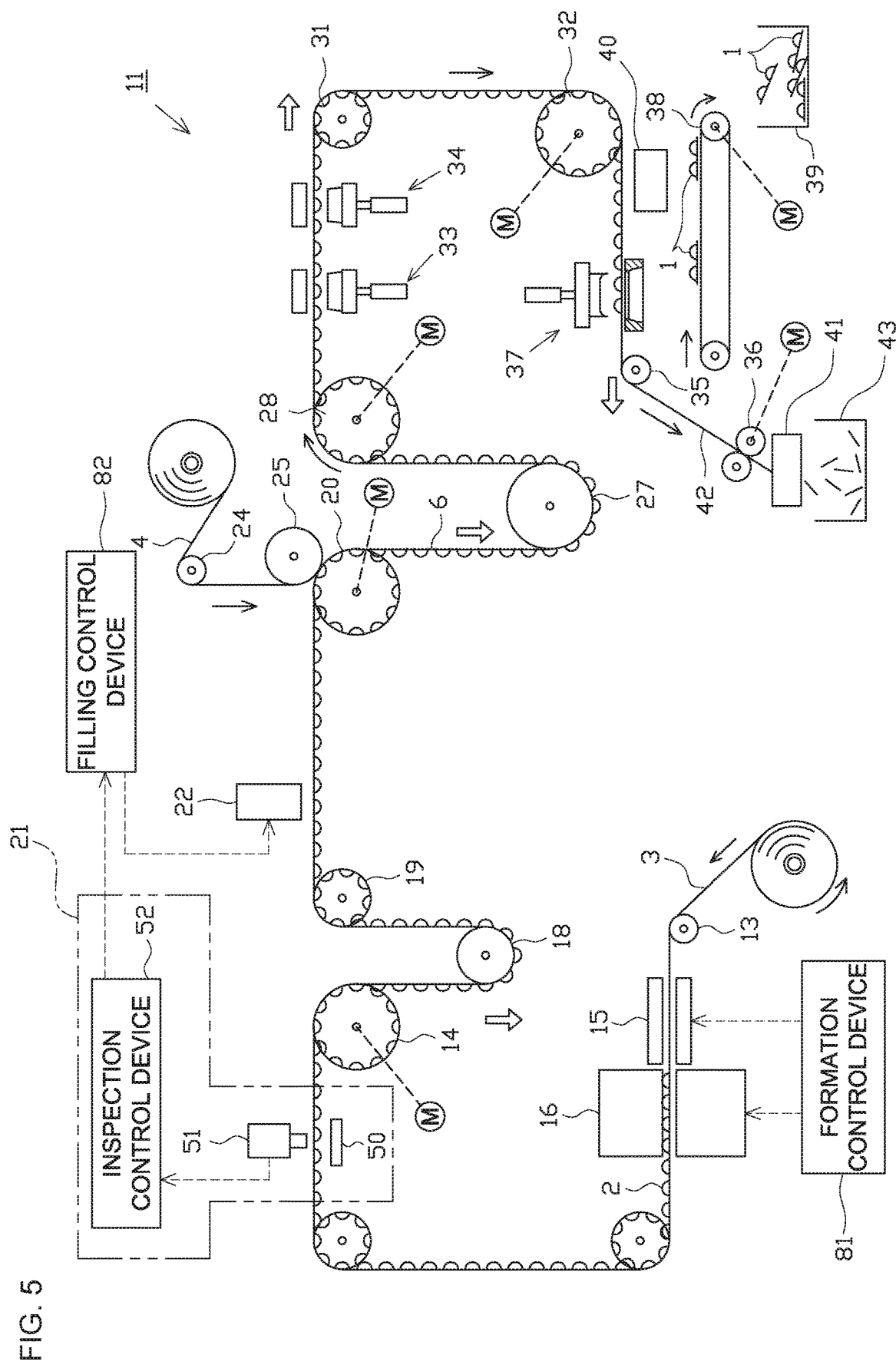
FIG. 5 is a schematic configuration diagram illustrating a PTP packaging machine.
Figure 6:
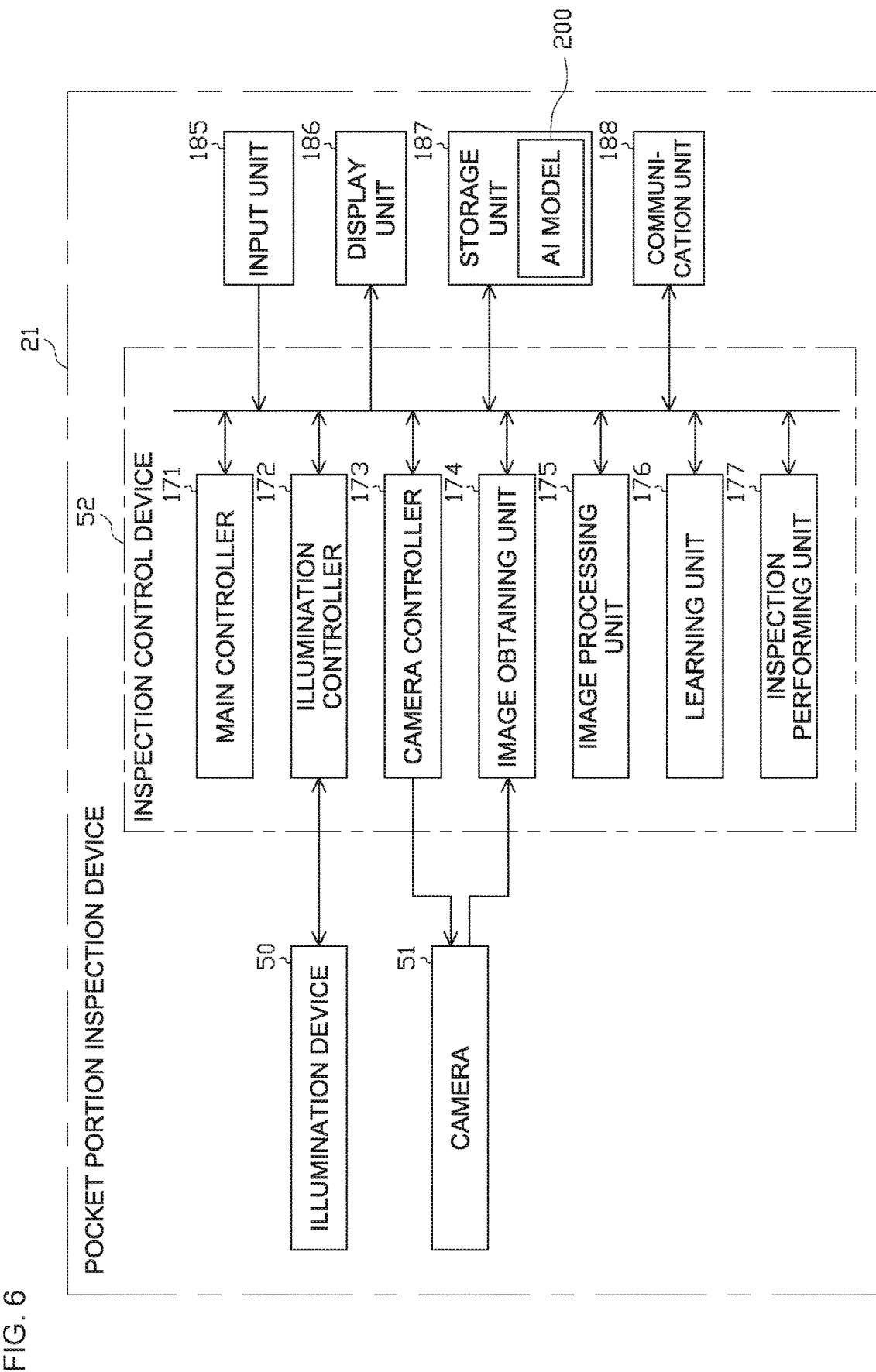
FIG. 6 is a block diagram illustrating the functional configuration of the pocket portion inspection device.

The following describes the configuration of the pocket portion inspection device 21 in detail. As shown in FIGS. 4 to 6, the pocket portion inspection device 21 includes an illumination device 50 serving as the irradiation unit, a camera 51 serving as the imaging unit (i.e., the imaging device), and an inspection control device 52 serving to control the illumination device 50 and the camera 51.

The illumination device 50 irradiates a predetermined range of the container film 3 with a predetermined electromagnetic wave from a protrusion side (from a lower side in FIG. 4) of the pocket portions 2. The illumination device 50 includes an electromagnetic wave radiation device 50a and a diffusion plate 50b provided to cover the electromagnetic wave radiation device 50a, and is configured to allow for surface emission. The illumination device 50 according to one or more embodiments irradiates the container film 3 with an electromagnetic wave including ultraviolet light.

The camera 51 has a sensitivity in a wavelength range of the electromagnetic wave radiated from the illumination device 50. The camera 51 is provided on an opening side (on an upper side in FIG. 4) of the pocket portions 2 of the container film 3 and is arranged such that an optical axis OL of a lens of the camera 51 is along a vertical direction (Z direction) perpendicular to the film flat portion 3b of the container film 3.

A bandpass filter 51a is provided corresponding to the lens of the camera 51. The band pass filter 51a is provided to cause only the ultraviolet light to enter the lens.

Providing the bandpass filter 51a causes only the ultraviolet light transmitted through the container film 3, out of the electromagnetic wave radiated from the illumination device 50, to be subjected to two-dimensional imaging by the camera 51. Transmission image data thus obtained by the camera 51 are luminance image data having different luminance values at respective pixels (at respective coordinate positions), based on a difference in transmittance of the ultraviolet light in the container film 3.

According to one or more embodiments, the band pass filter 51a used is, for example, a bandpass filter that allows for transmission of only ultraviolet light having a wavelength of 253±20 nm, which provides the transmittance of the container film 3 of about 30±10 percent. This is because both an excessively high transmittance and an excessively low transmittance of the electromagnetic wave transmitted through the container film 3 may fail to make a distinct difference in the transmittance of light between a thin wall location and a thick wall location in the bottom portion 2a of the pocket portion 2.

The imaging range of the camera 51 according to one or more embodiments is set to image at least a range including a total of twenty pocket portions 2 corresponding to two PTP sheets 1 formed in the container film 3 by one operation of the pocket portion forming device 16, i.e., a range including five pocket portions 2 in the film width direction of the container film 3 (Y direction) and four pocket portions 2 in the film conveyance direction (X direction).

The inspection control device 52 is configured by a computer including, for example, a CPU (central processing unit) that performs predetermined arithmetic operations; a ROM (read only memory) that stores, for example, various programs and fixed value data; a RAM (random access memory) that temporarily stores various data in the course of execution of various arithmetic operations; and peripheral circuits thereof.

The CPU operates according to various programs, so that the inspection control device 52 serves as various functional parts including a main controller 171, an illumination controller 172, a camera controller 173, an image obtaining unit 174, an image processing unit 175, a learning unit 176, and an inspection performing unit 177 described later.

The various functional parts described above are implemented by cooperation of various hardware components including the CPU, the ROM and the RAM described above. There is no need to distinctively differentiate the functions implemented by the software from the functions implemented by the hardware. Part or the entirety of these functions may be implemented by hardware circuits such as ICs.

The inspection control device 52 also includes an input unit 185 configured by a keyboard and a mouse, a touch panel or the like, a display unit 186 provided with a display screen such as a liquid crystal display, a storage unit 187 configured to store various data, programs and results of calculations, and a communication unit 188 configured to receive and send various data from and to outside.

The following describes the above various functional parts constituting the inspection control device 52. The main controller 171 is a functional part provided to control the entire pocket portion inspection device 21 and is configured to receive and send various signals from and to the other functional parts such as the illumination controller 172 and the camera controller 173.

The illumination controller 172 is a functional part provided to drive and control the illumination device 50 and is configured to control, for example, an illumination timing, based on a command signal from the main controller 171.

The camera controller 173 is a functional part provided to drive and control the camera 51 and is configured to control, for example, an imaging timing, based on a command signal from the main controller 171. The main controller 171 controls these illumination timing and imaging timing, based on signals from a non-illustrated encoder provided in the PTP packaging machine 11.

Accordingly, a process of irradiating the container film 3 with the electromagnetic wave from the illumination device 50 and taking an image of the electromagnetic wave (ultraviolet light) transmitted through the container film 3 by using the camera 51 is performed during every interval when the conveyance of the container film 3 with the pocket portions 2 formed therein is temporarily stopped.

The transmission image data taken and generated by the camera 51 are converted into digital signals (image signals) inside of the camera 51 and are transferred in the form of digital signals to the inspection control device 52 (the image obtaining unit 174).

The image obtaining unit 174 is a functional part provided to take in image data taken and obtained by the camera 51.

The image processing unit 175 is a functional part provided to process the image data taken in by the image obtaining unit 174 by predetermined image processing. For example, the image processing unit 175 generates shading pattern data for learning that is learning data used for learning of a deep neural network 190 (hereinafter simply referred to as "neural network 190", shown in FIG. 8) in a learning process described later. The image processing unit 175 also generates shading pattern data for inspection that is used in an inspection process described later. In one or more embodiments, the imaging conditions of the shading pattern data for learning used in the learning process may be made similar to the imaging conditions of the shading pattern data for inspection used in the inspection process, to a possible extent.

The learning unit 176 is a functional part provided to perform learning of the neural network 190 by using learning data or the like and to build an AI (Artificial Intelligence) model 200 serving as the identification unit.

The AI model 200 according to one or more embodiments is a generated model built by deep learning of the neural network 190 with using, as the learning data (as the shading pattern data for learning), only shading pattern data with regard to the pocket portions 2 of a non-defective container film 3 without any formation defect as described later, and has a structure of a so-called autoencoder.

Figure 8:
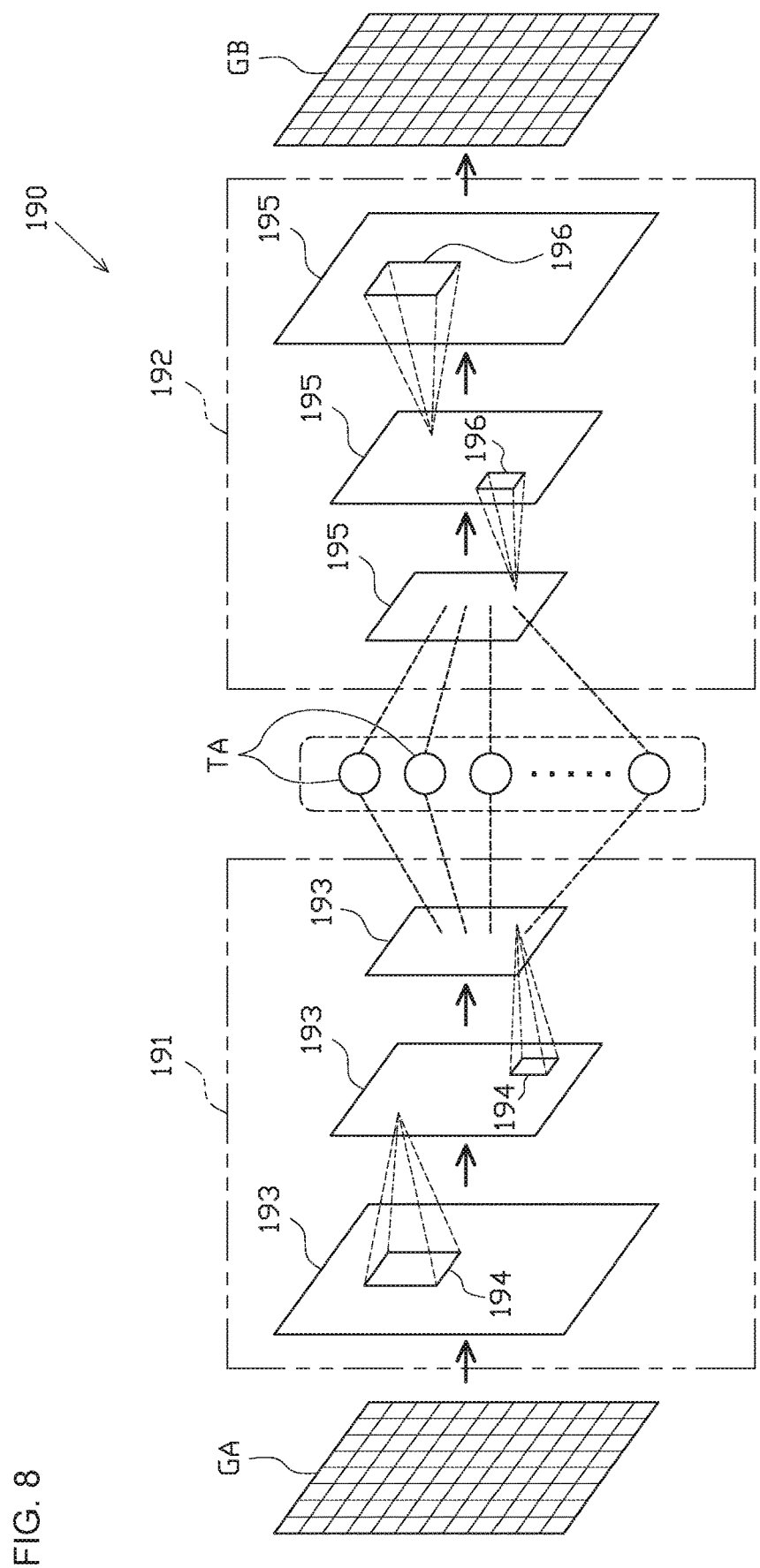
FIG. 8 is a schematic diagram illustrating the structure of a neural network.

The following describes the structure of the neural network 190 with reference to FIG. 8. FIG. 8 is a schematic diagram conceptually illustrating the structure of the neural network 190. As shown in FIG. 8, the neural network 190 has the structure of a convolutional autoencoder (CAE) that includes an encoder unit 191 serving as an encoding portion to extract a characteristic amount (latent variable) TA from input image data (shading pattern data) GA and a decoder unit 192 serving as a decoding portion to restructure image data (shading pattern data) GB from the characteristic amount TA.

The structure of the convolutional autoencoder is known in the art and is not described in detail herein. The encoder unit 191 has a plurality of convolution layers 193. Each convolution layer 193 is configured to output a result of a convolution operation of input data using a plurality of filters (kernels) 194, as input data of a next layer. Similarly, the decoder unit 192 has a plurality of deconvolution layers 195. Each deconvolution layer 195 is configured to output a result of a deconvolution operation of input data using a plurality of filters (kernels) 196, as input data of a next layer. A weight (parameter) of each of the filters 194 and 196 is updated in a learning process described later.

The inspection performing unit 177 is a functional part provided to perform an inspection for the formation state of the pocket portions 2. The details of the inspection of the pocket portions performed by the inspection performing unit 177 will be described later.

The storage unit 187 is configured by, for example, an HDD (Hard Disk Drive) or an SSD (Solid State Drive) and is provided to store, for example, various set information used for inspection and the results of the inspection. According to one or more embodiments, the various set information set and stored in the storage unit 187 include, for example, the shapes and the dimensions of the PTP sheet 1, the pocket portions 2 and the tablets 5, the shape and the dimensions of an inspection frame used to define an inspection range (a range corresponding to one PTP sheet 1) and a relative positional relationship of the inspection frame to the camera 51, and the shape and the dimensions of a pocket frame W used to define an area of the pocket portions 2 and a relative positional relationship of the pocket frame W to the camera 51 (or to the inspection frame).

Additionally, a predetermined storage area is provided in the storage unit 187 to store the AI model 200 (the neural network 190 and learning information obtained by learning of the neural network 190).

The communication unit 188 includes a wireless communication interface or the like in conformity with a communications standard such as a wired LAN (Local Area Network) or a wireless LAN and is configured to send and receive various data to and from outside. For example, the communication unit 188 is configured to receive and send signals from and to the filling control device 82 described later and is configured to output, for example, the results of the inspection to the filling control device 82.

Figure 9:
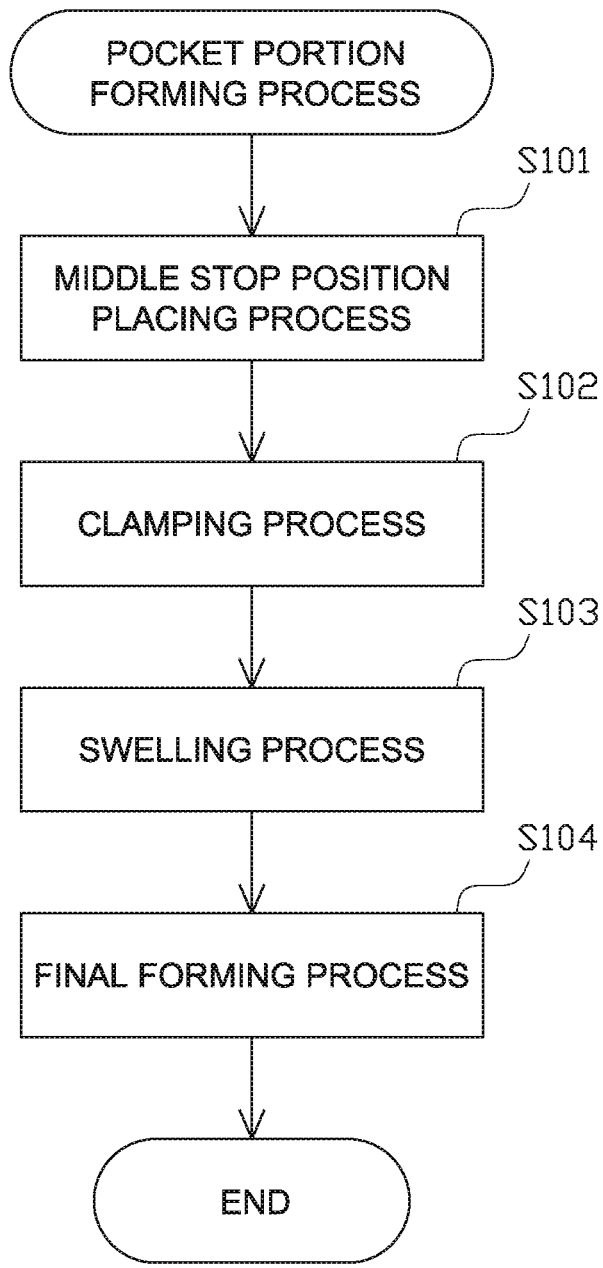
FIG. 9 is a flowchart showing a flow of a pocket portion forming process.

The following describes a pocket portion forming process performed under control of the formation control device 81, with reference to FIG. 9.

The pocket portion forming process first performs a middle stop position placing process at step S101. The middle stop position placing process moves the sliders 65 to move the pocket portion forming mold 66 up and thereby move the plugs 66a placed at the initial position upward.

When the plugs 66a reach the set middle stop position, the sliders 65 stop moving, so as to place the plugs 66a at the middle stop position. In this state, the leading end faces of the plugs 66a are away from the container film 3 by a predetermined distance. This predetermined distance is generally smaller than the depth of the pocket portions 2.

A clamping process at step S102 is subsequently performed to move the upper mold 71 downward and thereby place the container film 3 between the stationary lower mold 61 and the upper mold 71. In this state, a ring-shaped portion of the container film 3 located around the predetermined forming portions 3a (shown in FIG. 7) for forming the pocket portions 2 is placed between the respective molds 61 and 71. The middle stop position placing process and the clamping process may be performed simultaneously, or the clamping process may be performed prior to the middle stop position placing process.

A swelling process at step S103 is subsequently performed to supply a gas from the gas supply device 76 through the gas supply path 75 to the gas supply holes 74 and thereby blow the compressed air from a surface side of the container film 3 (from an upper side in FIG. 7) to the predetermined forming portions 3a for forming the pocket portions 2 in the container film 3. Supplying the gas causes the predetermined forming portions 3a to be swollen to an opposite side (to a lower side in FIG. 7), which is opposite to a protrusion side of the pocket portions 2 (an upper side in FIG. 7), and to be stretched to be thinned.

The predetermined forming portions 3a are accordingly swollen such as to be supported by the leading end faces of the plugs 66a. In the case of swelling the predetermined forming portions 3a by the supply of the gas, the swollen predetermined forming portions 3a generally have substantially the same wall thicknesses.

The stretch amount of the container film 3 is varied according to a variation in the middle stop position of the plugs 66a, so as to vary the wall thicknesses of the predetermined forming portions 3a. A relatively high middle stop position of the plugs 66a provides a relatively small stretch amount of the container film 3 and thereby makes the predetermined forming portions 3a generally thick.

A relatively low middle stop position of the plugs 66a, on the other hand, provides a relatively large stretch amount of the container film 3 and thereby makes the predetermined forming portions 3a generally thin.

A final forming process at step S104 is subsequently performed to move up the plugs 66a and place the plugs 66a at the protrusion position. As a result, the swelling direction in the predetermined forming portions 3a is reversed to form the pocket portions 2 having a predetermined depth. According to one or more embodiments, the plugs 66a, the gas supply device 76 and the other relevant components constitute the stretch unit (stretch formation unit) to stretch parts of the container film 3 (the predetermined forming portions 3a) and form the pocket portions 2.

In the case of transforming the container film 3 by pressing, areas of the predetermined forming portions 3a corresponding to the bottom portions 2a are brought into contact with the plugs 66a and cooled down, so as to be hardly stretched. Accordingly, when the predetermined forming portions 3a are generally made thick by setting a relatively high middle stop position, the areas corresponding to the bottom portions 2a are kept thick in the course of pressing by the plugs 66a. As a result, the side portions 2b of the pocket portions 2 to be formed have relatively small wall thicknesses.

When the predetermined forming portions 3a are generally made thin by setting a relatively low middle stop position, on the other hand, the areas corresponding to the bottom portions 2a are kept thin in the course of pressing by the plugs 66a. As a result, the side portions 2b of the pocket portions 2 to be formed have relatively large wall thicknesses.

Regulating the middle stop position of the plugs 66a to regulate the wall thicknesses of the predetermined forming portions 3a in this manner allows for adjustment of the balance between the wall thicknesses of the bottom portions 2a and the wall thicknesses of the side portions 2b in the pocket portions 2 to be eventually formed.

After the final forming process, the plugs 66a are placed at the initial position, and clamping of the container film 3 by the respective molds 61 and 62 is released. This terminates the pocket portion forming process.

The following describes the filling control device 82. The filling control device 82 serves to perform controls relating to filling of the tablets 5 by the tablet filling device 22 and is configured by a computer system including, for example, a CPU and a RAM. The filling control device 82 configures the filling control unit according to one or more embodiments.

More specifically, the filling control device 82 according to one or more embodiments is configured to control switching between filling and non-filling of a tablet 5 in a predetermined pocket portion 2, based on a result of an inspection by the pocket portion inspection device 21.

Concretely, the filling control device 82 receives the input of a result of an inspection with regard to a predetermined PTP sheet 1 (formation state of ten pocket portions 2) from the pocket portion inspection device 21 and, when the result of the inspection indicates a non-defective determination result, controls the tablet filling device 22 to fill the tablets 5 into all the ten pocket portions 2 included in this PTP sheet 1.

When the result of the inspection with regard to a predetermined PTP sheet 1 indicates a defective determination result, on the other hand, the filling control device 82 controls the tablet filling device 22 not to fill the tablets 5 into any of the ten pocket portions 2 included in this PTP sheet 1. Simultaneously, the filling control device 82 outputs a defective signal to the defective sheet discharge mechanism 40. As a result, the PTP sheet 1 (defective sheet) relating to the defective signal is discharged by the defective sheet discharge mechanism 40.

Figure 10:
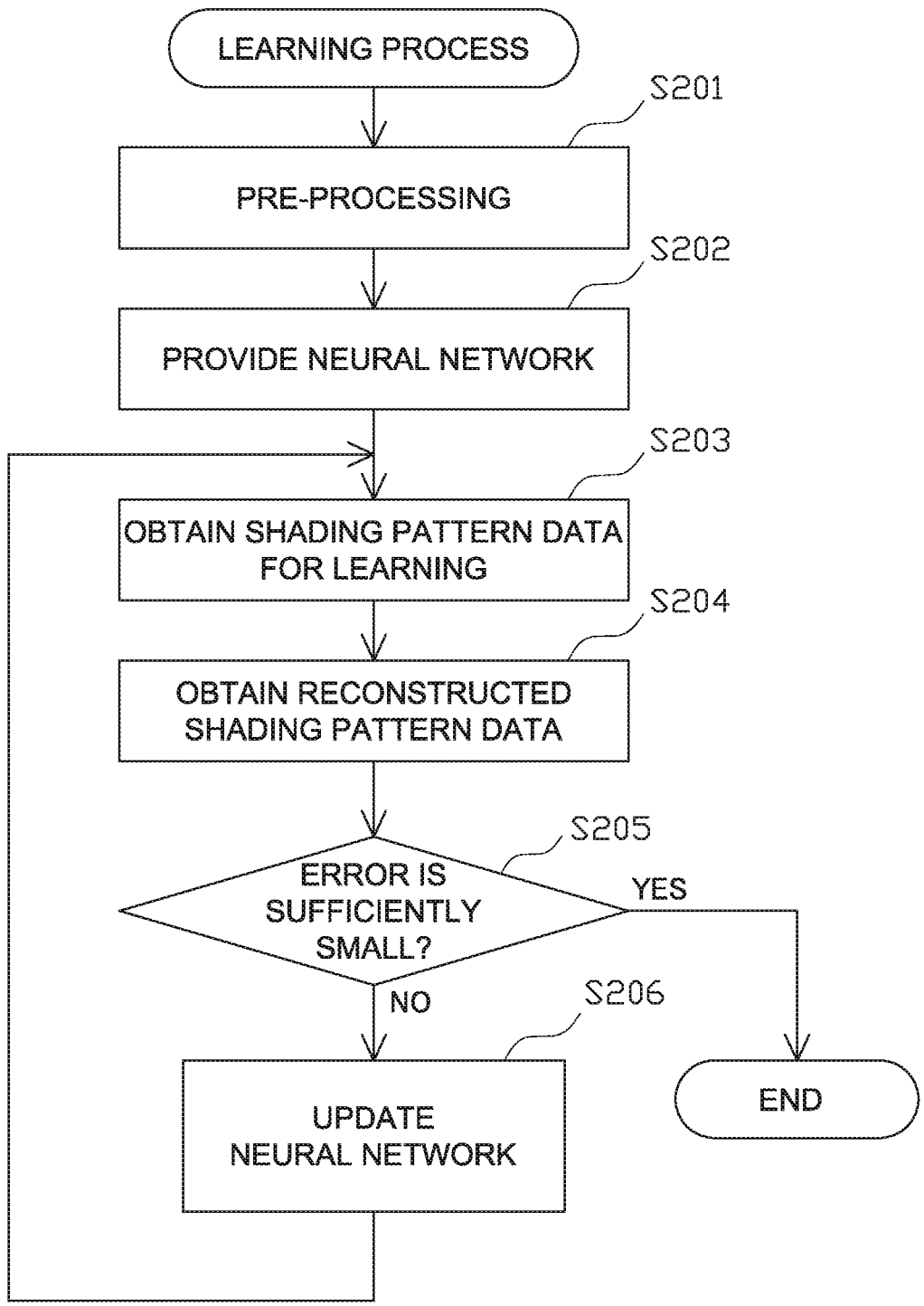
FIG. 10 is a flowchart showing a flow of a learning process of the neural network.

The following describes a learning process of the neural network 190 performed by the pocket portion inspection device 21 with reference to the flowchart of FIG. 10.

The operator first provides a non-defective container film 3 (a container film 3 corresponding to a plurality of PTP sheets 1 with a large number of non-defective pocket portions 2 formed therein). In one or more embodiments, the container film 3 to be provided may have pocket portions 2 in an identical shape with the shape of the pocket portions 2 formed in a container film 3 that is an inspection object. It is, however, not necessary that, for example, the thickness and the material of the container film 3 to be provided and the size and the arrangement layout of the pocket portions 2 formed therein are identical with those of the container film 3 and the pocket portions 2 as the inspection object. Learning based on a variety of different types of learning data is rather useful, in terms of the versatility.

The operator subsequently places the non-defective container film 3 (the container film 3 with the non-defective pocket portions 2 formed therein) provided in advance, at a predetermined inspection position of the pocket portion inspection device 21 and causes the main controller 171 to perform a predetermined learning program.

When a learning process is started by execution of the predetermined learning program, the main controller 171 first performs pre-processing for learning of the neural network 190 at step S201.

More specifically, in response to a command from the main controller 171, the illumination controller 172 first turns on the illumination device 50. In response to a command from the main controller 171, the camera controller 173 subsequently drives the camera 51 to take an image of a predetermined range of the container film 3. This obtains image data with regard to the predetermined range of the container film 3. The image data obtained by the camera 51 is taken in by the image obtaining unit 174, is subjected to a predetermined image processing operation (for example, shading correction or inclination correction) by the image processing unit 175, and is stored into the storage unit 187.

The series of processing described above is repeatedly performed with moving the imaging range on the container film 3, until image data (shading pattern data) with regard to a required number of pocket portions 2 are obtained as learning data.

When the image data (shading pattern data) with regard to the required number of pocket portions 2 for learning are obtained at step S201, the learning unit 176 provides a non-learnt neural network 190, in response to a command from the main controller 171, at subsequent step S202. For example, the learning unit 176 reads out a neural network 190 that has been stored in advance in the storage unit 187 or the like. In another example, the learning unit 176 builds a neural network 190, based on network configuration information (for example, the number of layers of a neural network and the number of nodes in each of the layers) stored in the storage unit 187 or the like.

At step S203, shading pattern data for learning is obtained as learning data. More specifically, in response to a command from the main controller 171, the image processing unit 175 extracts one pocket portion 2 out of a plurality of pocket portions 2 included in the image data, based on the image data stored in the storage unit 187 at step S201, and obtains shading pattern data corresponding to a shading pattern (a shading distribution image) occurring in a bottom portion 2a of the extracted pocket portion 2, as one shading pattern data for learning. The image processing unit 175 then outputs this shading pattern data for learning to the learning unit 176. Accordingly, only the shading pattern data with regard to the pocket portion 2 of the non-defective container film 3 without any formation defect is used as learning data (shading pattern data for learning).

At step S204, reconstructed shading pattern data is obtained. More specifically, in response to a command from the main controller 171, the learning unit 176 gives the shading pattern data for learning obtained at step S203, as input data, to an input layer of the neural network 190 and obtains shading pattern data, which is reconstructed data output, as a result of the input, from an output layer of the neural network 190, as reconstructed shading pattern data.

At subsequent step S205, the learning unit 176 compares the shading pattern data for learning obtained at step S203 with the reconstructed shading pattern data output from the neural network 190 at step S204 and determines whether or not an error is sufficiently small (whether or not an error is equal to or smaller than a predetermined reference value).

When the error is sufficiently small, the learning unit 176 stores the neural network 190 and learning information thereof (for example, updated parameters described later) as the AI model 200 into the storage unit 187 and terminates this learning process.

When the error is not sufficiently small, on the other hand, the learning unit 176 performs a network updating process (learning of the neural network 190) at step S206 and returns to step S203 to repeat the above series of processing.

More specifically, the network updating process at step S206 uses a known learning algorithm, for example, an error backpropagation algorithm, and updates weights (parameters) of the respective filters 194 and 196 described above in the neural network 190 to more appropriate values, such as to minimize a loss function indicating a difference between the shading pattern data for learning and the reconstructed shading pattern data. For example, a BCE (Binary Cross-entropy) may be used as the loss function.

Repeating the series of processing a number of times minimizes the error between the shading pattern data for learning and the reconstructed shading pattern data and enables the neural network 190 to output the reconstructed shading pattern data of the higher accuracy.

Figure 11:
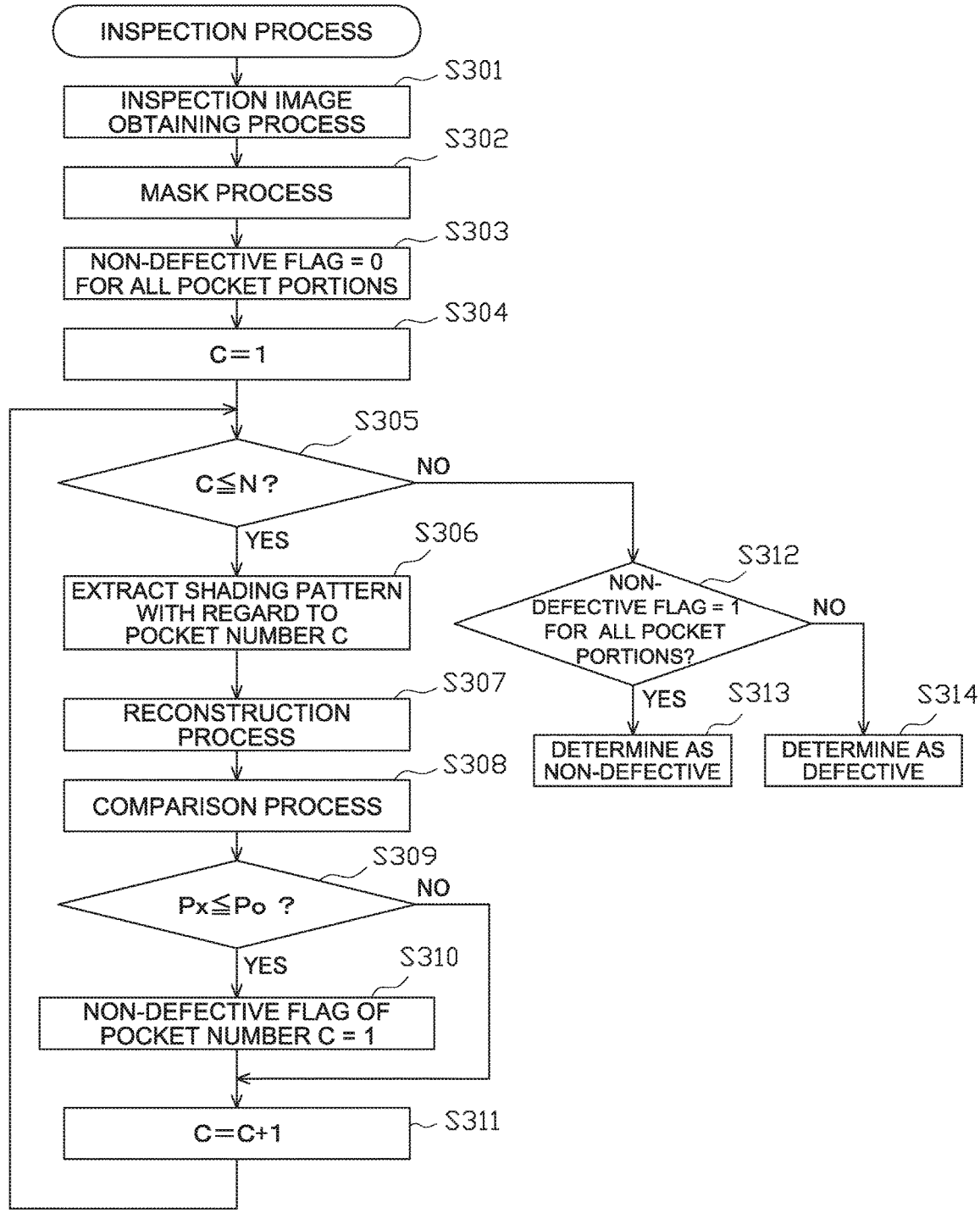
FIG. 11 is a flowchart showing a flow of an inspection process for a pocket portion.

The following describes the flow of a pocket portion inspection performed by the pocket portion inspection device 21 with reference to the flowchart of FIG. 11.

An inspection process of the pocket portion inspection shown in FIG. 11 is performed for each inspection range corresponding to an area punched out in a rectangular sheet form as one PTP sheet 1 that is a product. More specifically, the pocket portion inspection shown in FIG. 11 is performed for each of two inspection ranges during every interval when the conveyance of the container film 3 is temporarily stopped. This pocket portion inspection is described in detail.

When a predetermined range of the container film 3 with the pocket portions 2 formed therein by the pocket portion forming device 16 is stopped in the pocket portion inspection device 21, the inspection control device 52 causes the main controller 171 to perform a predetermined inspection program.

An inspection process started by execution of the predetermined inspection program first performs irradiation (irradiation process) to cause the predetermined range of the container film 3 to be irradiated with the electromagnetic wave (ultraviolet light) from the illumination device 50 and also performs imaging (imaging process) with the camera 51.

More specifically, in response to a command from the main controller 171, the illumination controller 172 turns on the illumination device 50, and the camera controller 173 drives the camera 51. This takes an image of a predetermined inspection range on the container film 3 and obtains transmission image data including a plurality of pocket portions 2. This transmission image data is taken in by the image obtaining unit 174.

When the transmission image data of the container film 3 is taken in by the image obtaining unit 174, the inspection control device 52 first performs an inspection image obtaining process (step S301).

More specifically, in response to a command from the main controller 171, the image processing unit 175 uses the inspection frame described above and obtains image data with regard to an inspection range corresponding to one PTP sheet 1 (a range including ten pocket portions 2), as an inspection image, based on the transmission image data of the container film 3 taken in by the image obtaining unit 174, and stores the obtained inspection image into the storage unit 187.

According to one or more embodiments, the position where a range on the container film 3 corresponding to each PTP sheet 1 is stopped, is fixed relative to the imaging range of the camera 51. The set position of the above inspection frame is determined in advance according to a relative positional relationship to the camera 51. In one or more embodiments, the set position of the above inspection frame is thus not regulated every time according to the image data. This configuration is, however, not essential. A modified configuration may appropriately regulate the set position of the above inspection frame, based on information obtained from the image data, by taking into account the occurrence of a positional misalignment and the like.

Another modification may be configured to process the inspection image by various processing operations. For example, there is a technical limitation in uniform irradiation of an overall imaging range with the electromagnetic wave from the illumination device 50. Accordingly, a modified configuration may perform shading correction to correct a variation in the intensity of the electromagnetic wave (luminance) caused by a difference in the position.

When the inspection image is obtained, the inspection control device 52 performs a mask process at subsequent step S302.

More specifically, in response to a command from the main controller 171, the image processing unit 175 sets pocket frames W (shown in FIG. 12) according to the respective positions of the ten pocket portions 2 on the inspection image obtained at step S301 and applies a mask M to an area other than pocket areas specified by the pocket frames W, i.e., an area corresponding to the film flat portion 3b.

According to one or more embodiments, the set positions of the pocket frames W are determined in advance according to a relative positional relationship to the above inspection frame. In one or more embodiments, the set positions of the pocket frames W are thus not regulated every time according to the image data. This configuration is, however, not essential. A modified configuration may appropriately regulate the set positions of the pocket frames W, based on information obtained from the inspection image, by taking into account the occurrence of a positional misalignment and the like.

The inspection control device 52 subsequently sets pocket non-defective flags of all the pocket portions 2 to a value "0" at step S303.

The "pocket non-defective flags" indicate results of good/poor quality judgment of respective corresponding pocket portion 2 and are set in a predetermined area of the storage unit 187. When the result of good/poor quality judgment of a predetermined pocket portion 2 is non-defective determination, the pocket non-defective flag corresponding to the predetermined pocket portion 2 is set to a value "1".

At subsequent step S304, the inspection control device 52 sets a pocket number counter value C set in the storage unit 187 to an initial value "1".

The "pocket number" is a serial number set corresponding to each of the ten pocket portions 2 included in one inspection range. The position of each pocket portion 2 is specified by the pocket number counter value C (hereinafter simply referred to as "pocket number C").

The inspection control device 52 subsequently determines whether the pocket number C is equal to or smaller a number of pockets N ("10" according to one or more embodiments) per inspection range (per PTP sheet 1) at step S305.

In the case of an affirmative determination, the inspection process proceeds to step S306. At step S306, in response to a command from the main controller 171, the inspection performing unit 177 performs shading pattern extraction (shading pattern extraction process) to extract shading pattern data with regard to a pocket portion 2 specified by the current pocket number C. The function of performing this process mainly configures the shading pattern extraction unit according to one or more embodiments.

Figure 12:
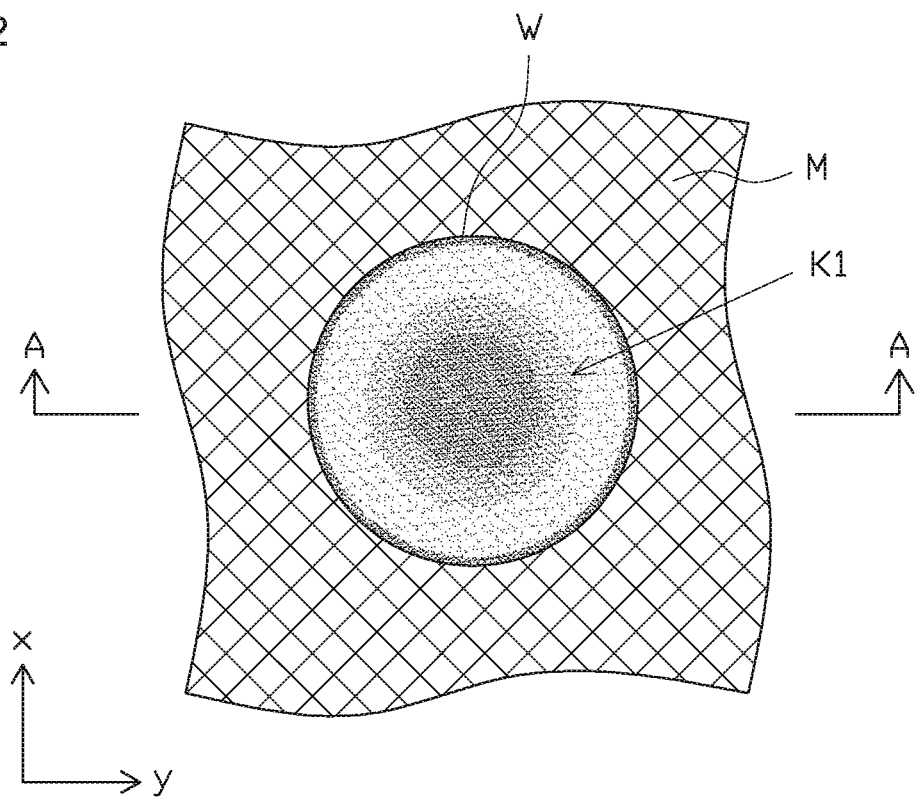
FIG. 12 is a diagram illustrating a shading pattern occurring in a pocket portion without any formation defect.
Figure 14:
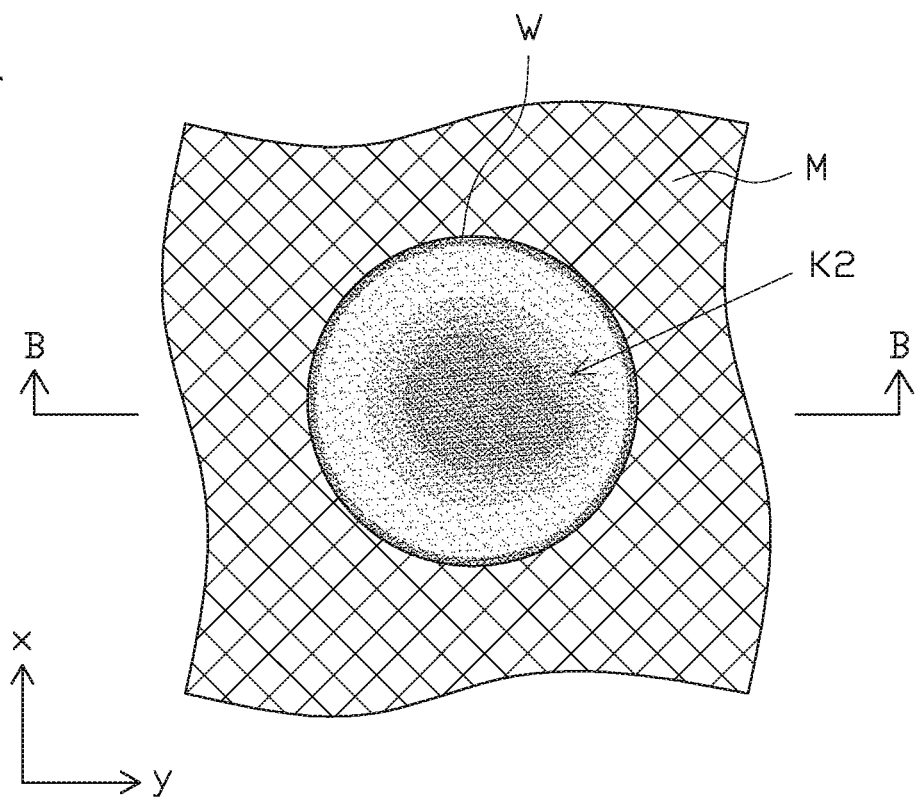
FIG. 14 is a diagram illustrating a shading pattern occurring in a pocket portion with a formation defect.

More specifically, the inspection performing unit 177 extracts a shading image in the pocket frame W with regard to the pocket portion 2 corresponding to the current pocket number C (for example, C=1) in the inspection image mask-processed at step S302 (masking image data), as shading pattern data corresponding to a shading pattern K occurring in the bottom portion 2*a* of the pocket portion 2 (refer to, for example, a shading pattern K1 shown in FIG. 12 and a shading pattern K2 shown in FIG. 14).

Figure 13:
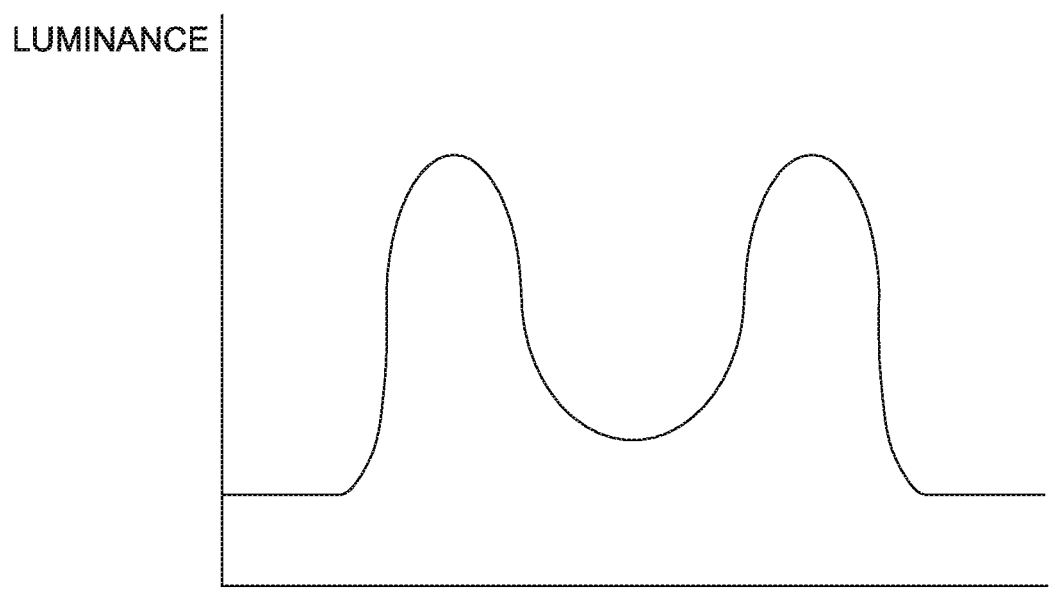
FIG. 13 is a graph showing luminance values at respective pixels along a line A-A in FIG. 12.

FIG. 12 is a diagram illustrating a shading pattern K1 occurring in a bottom portion 2*a* of a pocket portion 2 without any formation defect, and FIG. 13 is a graph showing luminance values at respective pixels along an A-A line of the shading pattern K1 shown in FIG. 12.

Figure 15:
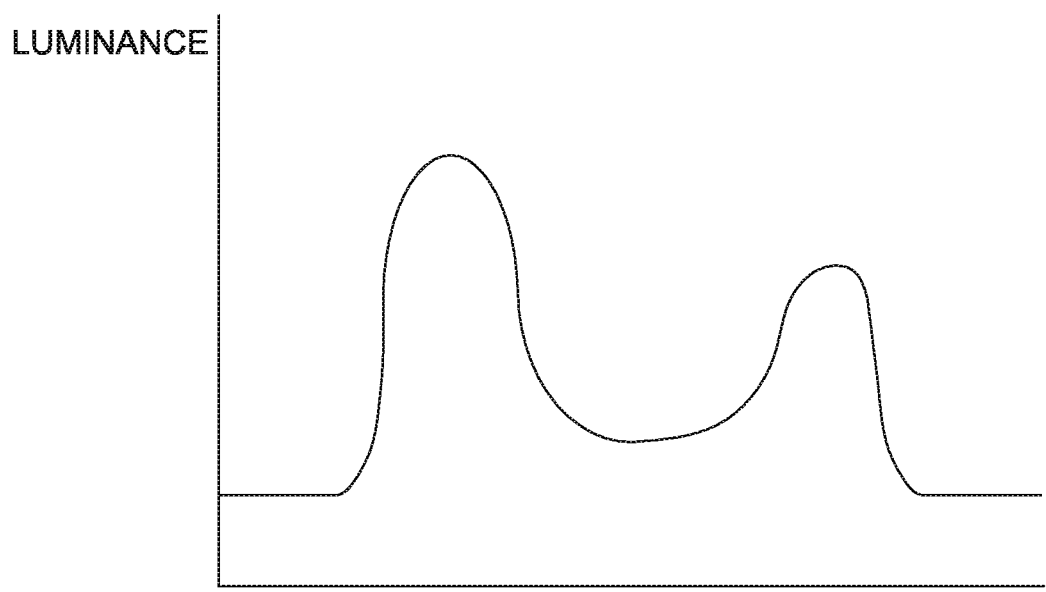
FIG. 15 is a graph showing luminance values at respective pixels along a line B-B in FIG. 14.

FIG. 14 is a diagram illustrating a shading pattern K2 occurring in a bottom portion 2*a* of a pocket portion 2 with a formation defect, and FIG. 15 is a graph showing luminance values at respective pixels along a B-B line of the shading pattern K2 shown in FIG. 14.

The shading pattern (shading pattern data) K is two-dimensional image information including luminance information (for example, any value of 256 tones from 0 to 255) of every pixel, and corresponds to an image showing a two-dimensional distribution of shading occurring in, for example, the bottom portion 2*a* of the pocket portion 2 (intensity distribution image of the transmitted electromagnetic wave), according to a relationship between different wall thicknesses at respective positions (coordinate positions) in, for example, the bottom portion 2*a* of the pocket portion 2 (wall thickness distribution) and the transmittances of the electromagnetic wave transmitted through the respective positions.

In one or more embodiments, the pocket frame W is set according to an opening peripheral portion of the pocket portion 2 (a connecting part of the side portion 2*b* and the film flat portion 3*b*). The shading pattern obtained at step S306 accordingly includes a shading pattern with regard to the side portion 2*b* of the pocket portion 2 and a shading pattern with regard to the corner portion 2*c* of the pocket portion 2 where the bottom portion 2*a* intersects with the side portion 2*b*, as well as a shading pattern with regard to the bottom portion 2*a* of the pocket portion 2.

With regard to the range of the shading pattern K corresponding to the bottom portion 2*a*, the shading pattern obtained has a shading distribution (luminance distribution) substantially corresponding to the wall thickness distribution of the bottom portion 2*a*. With regard to the range of the shading pattern corresponding to the side portion 2*b* and the corner portion 2*c*, on the other hand, the luminance information does not correspond to the electromagnetic wave transmitted along a wall thickness direction (the X direction or the Y direction) of the side portion 2*b* or the like but corresponds to the electromagnetic wave transmitted along the stretching direction during formation (the Z direction), so that the shading pattern obtained is not significantly related to the wall thickness of the side portion 2*b* or the like.

At subsequent step S307, the inspection performing unit 177 performs a reconstruction process (reconstructed data obtaining process). The function of performing this process mainly configures the reconstructed data obtaining unit according to one or more embodiments.

More specifically, the inspection performing unit 177 inputs the shading pattern data K with regard to the bottom portion 2*a* of the pocket portion 2 specified by the pocket number C (for example, C=1) extracted at step S306, into an input layer of the AI model 200. The inspection performing unit 177 then obtains shading pattern data which is reconstructed data reconstructed by the AI model 200 and output from an output layer of the AI model 200, as reconstructed shading pattern data KS with regard to the bottom portion 2*a* of the pocket portion 2 specified by the pocket number C (for example, C=1).

Figure 16A:
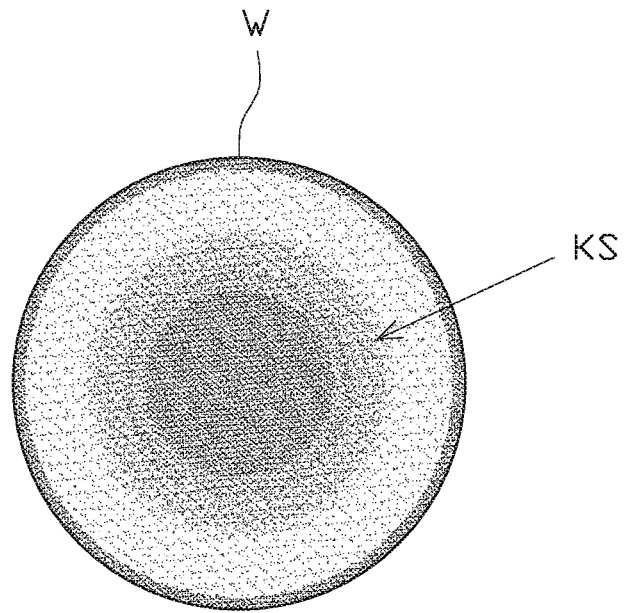
FIG. 16A is a diagram schematically illustrating reconstructed shading pattern data obtained by reconstruction of shading pattern data.

The learning described above enables the AI model 200 to output shading pattern data with regard to the bottom portion 2*a* of the pocket portion 2 without any formation defect as shown in FIG. 16A, as the reconstructed shading pattern data KS, not only in the case of input of the shading pattern data K1 with regard to the bottom portion 2*a* of the pocket portion 2 without any formation defect as shown in FIG. 12 but even in the case of input of the shading pattern data K2 with regard to the bottom portion 2*a* of the pocket portion 2 with a formation defect as shown in FIG. 14.

At subsequent step S308, the inspection performing unit 177 makes a comparison (performs a comparison process). The function of performing this process mainly configures the comparison unit according to one or more embodiments.

Figure 16B:
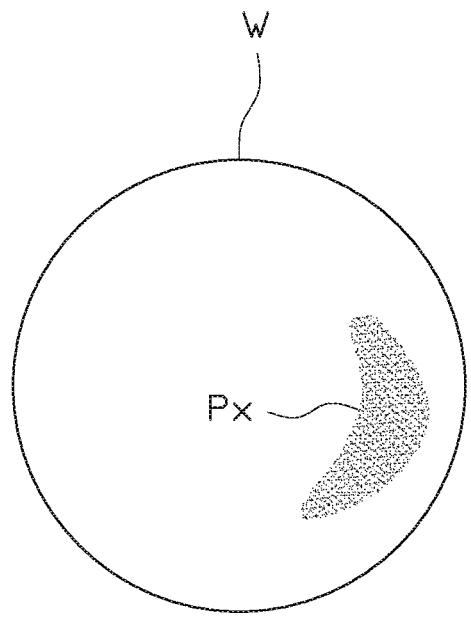
FIG. 16B is a diagram schematically illustrating a location where defective pixels occur in a comparison process.

More specifically, the inspection performing unit 177 first compares the shading pattern data K extracted at step S306 with the reconstructed shading pattern data KS obtained at step S307 and calculates a difference in luminance at each pixel between the two data. The inspection performing unit 177 subsequently specifies pixels having the differences out of a predetermined allowable range as defective pixels Px and calculates a total number of the defective pixels Px (defective area). FIG. 16B is a diagram schematically illustrating a location where the defective pixels Px occur in the comparison process.

At step S309, the inspection performing unit 177 determines whether the number of the defective pixels Px calculated at step S308 is equal to or less than a preset determination criterion Po. This determines whether the number of the defective pixels Px is in an allowable range and thereby performs the good/poor quality judgment with regard to the formation state of the pocket portion 2. The function of performing such good/poor quality judgment (good/poor quality judgment process) at step S309 configures the good/poor quality judgment unit according to one or more embodiments.

This configuration is, however, not essential. A modified configuration may perform the good/poor quality judgment by another method, for example, a method of determining whether a connecting component having a maximum area out of connecting components of the defective pixels Px is in the allowable range or a method of determining a degree of variation in the connecting components of the defective pixels Px (distribution state). Another modified configuration may determine that the pocket portion 2 is a defective in the presence of even one defective pixel Px, irrespective of the number of the defective pixels Px.

In the case of affirmative determination that the number of the defective pixels Px is equal to or less than the determination criterion Po at step S309, the inspection performing unit 177 proceeds to step S310. In the case of negative determination, on the other hand, the inspection performing unit 177 regards the pocket portion 2 corresponding to the current pocket number C as a defective and proceeds to step S311.

At step S310, the inspection performing unit 177 regards the pocket portion 2 corresponding to the current pocket number C as a non-defective, sets the pocket non-defective flag corresponding to the current pocket number C to the value "1" and then proceeds to step S311.

The inspection control device 52 subsequently adds "1" to the current pocket number C at step S311 and returns to step S305.

When the newly set pocket number C is still equal to or smaller than the number of pockets N ("10" according to one or more embodiments), the inspection control device 52 proceeds to step S306 again and repeats the series of processing described above.

When it is determined that the newly set pocket number C exceeds the number of pockets N, on the other hand, the inspection control device 52 regards that the good/poor quality judgment with regard to all the pocket portions has been completed and accordingly proceeds to step S312.

At step S312, the inspection control device 52 determines whether the value of the pocket non-defective flag is equal to "1" with regard to all the pocket portions 2 included in the inspection range. This determines whether the PTP sheet 1 corresponding to the inspection range is a non-defective product or a defective product.

In the case of affirmative determination, i.e., when all the pocket portions 2 included in the inspection range are "non-defective" and there is no pocket portion 2 determined as "defective", the inspection control device 52 determines that the PTP sheet 1 corresponding to the inspection range as a "non-defective product" at step S313 and then terminates this inspection process.

In the case of negative determination at step S312, i.e., when at least one pocket portion 2 determined as "defective" is present in the inspection range, the inspection control device 52 determines that the PTP sheet 1 corresponding to the inspection range as a "defective product" at step S314 and then terminates this inspection process.

In the non-defective determination process of step S313 and in the defective determination process of step S314, the inspection control device 52 stores the results of the inspection with regard to the PTP sheet 1 corresponding to the inspection range into the storage unit 187 and also outputs the results of the inspection to the filling control device 82.

As described above in detail, the configuration of one or more embodiments irradiates the container film 3 with the electromagnetic wave from the illumination device 50 and takes an image of the electromagnetic wave (ultraviolet light) transmitted through the container film 3 by using the camera 51 during every interval when the conveyance of the container film 3 with the pocket portions 2 formed therein is temporarily stopped; extracts the shading pattern (shading pattern data) K occurring in the bottom portion 2a of the pocket portion 2 from the obtained transmission image data; and performs the good/poor quality judgment with regard to the formation state of the pocket portion 2.

This configuration allows for the good/poor quality judgment with regard to the formation state (the state of the wall thickness distribution) of the side portion 2b and the corner portion 2c of the pocket portion 2, as well as the good/poor quality judgment with regard to the formation state (the state of the wall thickness distribution) of the bottom portion 2a of the pocket portion 2. This configuration accordingly enables a formation defect (defect of wall thickness) of the side portion 2b or the like of the pocket portion 2, for example, an unevenness in the wall thickness distribution of the side portion 2b or the like of the pocket portion 2, to be detected with high accuracy.

Especially, the configuration of one or more embodiments performs the inspection with regard to the formation state of the side portion 2b and the like of the pocket portion 2 by using the AI model 200 built by learning of the neural network 190.

More specifically, the configuration of one or more embodiments compares the shading pattern data K obtained by taking an image of the bottom portion 2a of the pocket portion 2 with the reconstructed shading pattern data KS obtained by reconstruction of the shading pattern data K by the AI model 200 to perform the good/poor quality judgment.

This configuration enables an inspection to be performed, for example, with regard to even a subtle formation defect which the prior art configuration has difficulty in detection or with regard to the pocket portion 2 including the bottom portion 2a having a complicated shape or a complicated wall thickness distribution. As a result, this further enhances the inspection accuracy.

Furthermore, the configuration of one or more embodiments compares the shading pattern data K obtained by taking an image of the pocket portion 2 with the reconstructed shading pattern data KS obtained by reconstruction based on the shading pattern data K. The two shading pattern data to be compared with each other are free from the effects due to differences in the imaging conditions on the container film 3-side as the inspection object (for example, the arrangement position, the arrangement angle, and the deflection of the container film 3) and the imaging conditions on the pocket portion inspection device 21-side (for example, the illumination conditions of the illumination device 50 and the angle of view of the camera 51). This configuration accordingly enables a more subtle formation defect to be detected with the higher accuracy.

The configuration of one or more embodiments enables the formation state of the entire circumference of the side portion 2b to be detected by one single imaging operation of taking an image of the bottom portion 2a of the pocket portion 2. This configuration increases the speed of the inspection and thereby improves the productivity of the blister pack.

Moreover, one or more embodiments are configured to perform an inspection for the container film having the translucency by using the ultraviolet light having the wavelength of 253±20 nm, which provides the transmittance of the container film 3 of about 30±10 percent. The ultraviolet light has the lower transmittance and the greater difficulty in transmission through the container film 3 having translucency, compared with the visible light. This configuration accordingly enables an inspection with regard to the formation state of the pocket portion 2 to be performed more appropriately. Furthermore, this configuration is more likely to cause a difference in the transmittance of the light between a thin-wall location and a thick-wall location in the bottom portion 2a of the pocket portion 2 and thereby enables an inspection to be performed more appropriately.

The present disclosure is not limited to the description of the above embodiments but may be implemented, for example, by configurations described below. The present disclosure may also be naturally implemented by applications and modifications other than those illustrated below.

(a) The configuration of the blister pack that is the inspection object is not limited to the configuration of the embodiments described above. For example, in the embodiments described above, the PTP sheet 1 with the contents such as the tablets 5 placed therein is illustrated as the blister pack.

This is, however, not essential. The inspection object may be any of various blister packs, for example, a peel open-type blister pack configured such that the content thereof is taken out by peeling off a cover film from a container film (for example, a portion pack for placing food stuff or the like therein), a blister pack configured such that the content thereof such as an electronic component is placed and conveyed, and a blister pack of such a type that a cover film is not mounted to a container film but a mount or the like is assembled to the container film.

(b) The configuration of the pocket portions in the container film, for example, the shape, the size, the depth, the number, and the arrangement of the pocket portions, is not limited to the configuration described in the above embodiments but may be appropriately selected according to, for example, the type, the shape, and the application of the content. For example, the bottom portion 2a of the pocket portion 2 may have an approximately triangular shape, an approximately elliptical shape, an approximately rectangular shape, or an approximately rhombic shape in plan view.

Figure 17A:
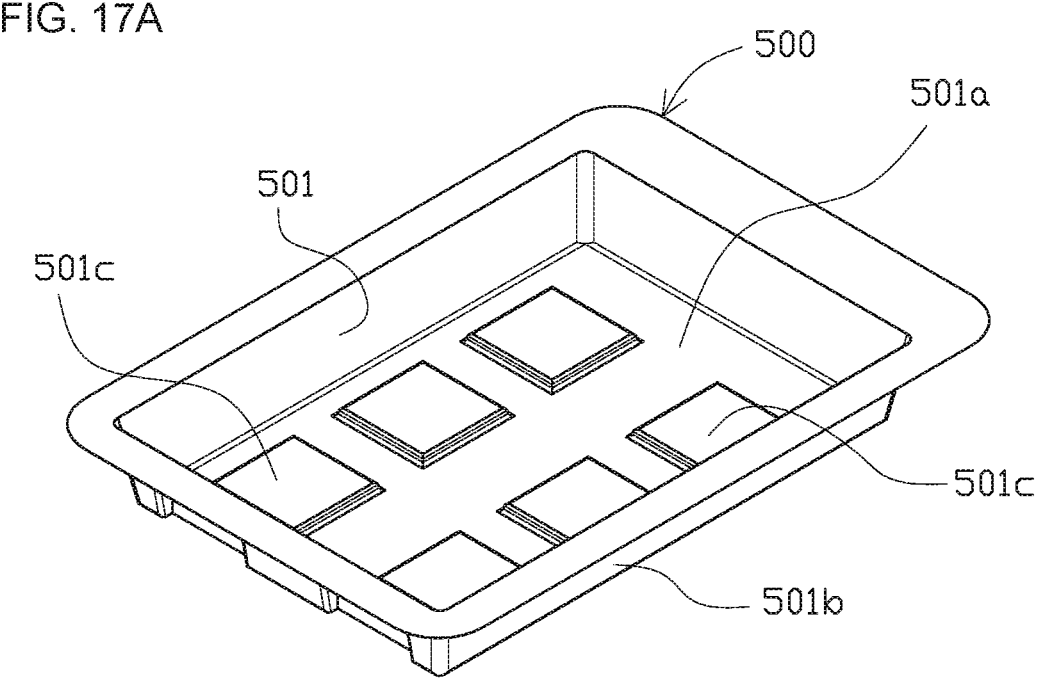
FIG. 17A is a perspective view and FIG. 17B is a plan view illustrating a blister pack according to another example of the embodiments.
Figure 17B:
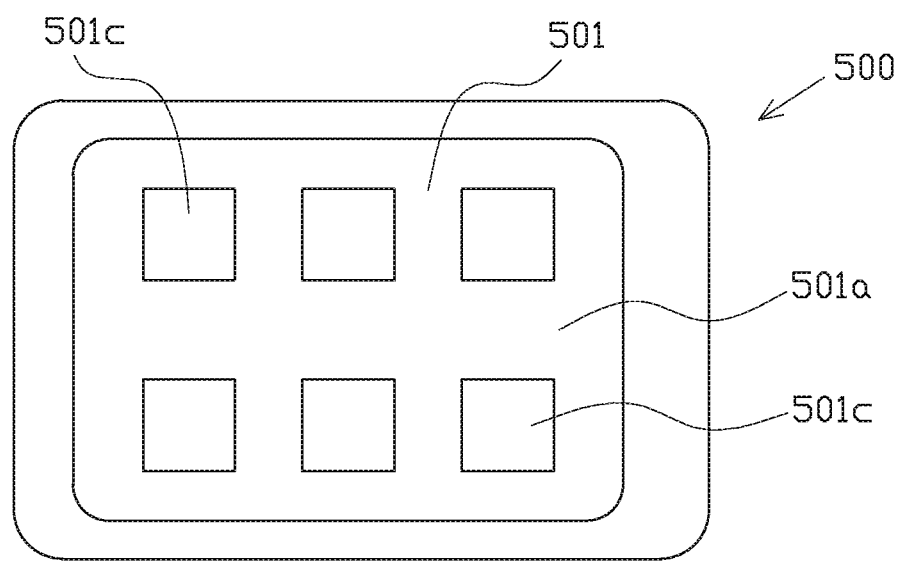

More concretely, the inspection object may be, for example, a blister pack 500 shown in FIGS. 17A and 17B. The blister pack 500 has a pocket portion 501. The pocket portion 501 includes a bottom portion 501a in a rectangular shape in plan view and a side portion 501b in a rectangular frame shape connecting with the circumference of the bottom portion 501a. A plurality of protruded ribs 501c that are swollen inward of the pocket are formed in the bottom portion 501a of the pocket portion 501.

The inspection procedure described in the above embodiments may also be applied to this pocket portion 501 to extract a shading image occurring in the bottom portion 501a (step S306) and perform the reconstruction process (step S307) and the comparison process (step S308). The inspection procedure accordingly specifies, for example, low luminance areas corresponding to thick wall areas (protruded ribs 501c) and high luminance areas corresponding to thin wall areas (the residual part of the bottom portion 501a) and performs the good/poor quality judgment with regard to the formation state of the pocket portion 501.

(c) The materials, the layered structures and the like of the container film and the cover film are not limited to those of the embodiments described above. For example, in the embodiments described above, the container film 3 is made of a colorless transparent thermoplastic resin material, for example, PP or PVC, and has translucency.

This configuration is, however, not essential. In a modified configuration, the container film 3 may be made of, for example, a colorless translucent resin material, a colored transparent or colored translucent resin material, or even an opaque material (for example, an opaque resin material or a metal material). One example of the metal material is a material mainly made of aluminum, such as an aluminum laminated film.

An inspection may be performed for the container film 3 made of an opaque material by using an electromagnetic wave, for example, X ray, which is radiated from the illumination device 50 and is transmitted through the opaque material as described below.

(d) The method of forming the pocket portions is not limited to the method described in the above embodiments. The above embodiments are configured to form the pocket portions 2 by the plug assist pressure forming technique.

Instead of this technique, any of various other known forming techniques, for example, a vacuum forming technique, a pressure forming technique or a plug forming technique, may be employed to partly heat, soften and stretch some part (the predetermined forming portions 3a) of the flat container film 3.

In the case where the container film is an aluminum laminated film, however, heating is likely to cause a separation between adhesive layers and to break the container film in the process of forming the pocket portions. A cold forming technique that is not accompanied with previous heating is accordingly suitable for the aluminum laminated film. Even in this case, however, in the process of forming the pocket portions, for example, the periphery of a clamping location in the container film is likely to be stretched to a larger extent, so that the container film is likely to be stretched unevenly. This may lead to a variation in the wall thickness in the respective parts of the pocket portions.

(e) The configurations of the irradiation unit and the imaging unit are not limited to those of the embodiments described above. For example, in the configuration of the above embodiments, the illumination device 50 is placed on the protrusion side of the pocket portions 2, and the camera 51 is placed on the opening side of the pocket portions 2. A modified configuration may reverse this positional relationship.

In the embodiments described above, the illumination device 50 is configured to radiate the electromagnetic wave including ultraviolet light. The wavelength of the electromagnetic wave radiated from the illumination device 50 may be appropriately changed according to the material, the color and the other conditions of the container film 3. Another modified configuration may omit the bandpass filter 51a and may cause the electromagnetic wave radiated from the illumination device 50 and transmitted through the container film 3 to directly enter the camera 51.

For example, when the container film 3 is made of an opaque material including, for example, aluminum as a primary component, X ray may be radiated from the illumination device 50. In another example, when the container film 3 is made of a colored translucent material, visible light, for example, white light, may be radiated from the illumination device 50.

(f) The configuration of the above embodiments uses the ultraviolet light having the wavelength of 253±20 nm, which provides the transmittance of the container film 3 of about 30±10 percent, for the inspection. A modified configuration may perform an inspection by using an electromagnetic wave of a different wavelength.

Both an excessively high transmittance and an excessively low transmittance of the electromagnetic wave transmitted through the container film 3 make it difficult to cause a difference in the transmittance of light between a thin wall location and a thick wall location in the bottom portion 2a of the pocket portion 2. It is accordingly preferable to use an electromagnetic wave having a wavelength that provides the transmittance of the container film 3 of not lower than 15 percent and not higher than 60 percent, and it is more preferable to use an electromagnetic wave having a wavelength that provides the transmittance of the container film 3 of not lower than 20 percent and not higher than 50 percent.

(g) The configuration and the learning method of the AI model 200 as the identification unit (the neural network 190) are not limited to those of the embodiments described above.

(g-1) A modified configuration may additionally process various data by, for example, normalization, as needed basis in the course of execution of the learning process of the neural network 190 or of the reconstruction process in the pocket portion inspection process, although such additional processing is not specifically stated in the above embodiments.

(g-2) The configuration of the neural network 190 is not limited to the configuration shown in FIG. 8. For example, a modified configuration may provide a pooling layer after the convolution layers 193. The number of layers of the neural network 190, the number of nodes in each layer, and the connection structure of the respective nodes may have different configurations.

(g-3) In the embodiments described above, the AI model 200 (the neural network 190) is the generated model having the structure of the convolution autoencoder (CAE). This is, however, not essential. The AI model 200 may be a generated model having the structure of another type of autoencoder, for example, a variational autoencoder (VAE).

(g-4) In the embodiments described above, learning of the neural network 190 is performed by the error backpropagation method. This configuration is, however, not essential. In a modified configuration, learning of the neural network 190 may be performed by using any of various other learning algorithms.

(g-5) The neural network 190 may be configured by an AI dedicated processing circuit such as an AI chip. In this configuration, only learning information, such as parameters, may be stored in the storage unit 187. The AI model 200 may be configured by setting the learning information read out by the AI dedicated processing circuit, in the neural network 190.

(g-6) The embodiments described above include the learning unit 176 configured to perform learning of the neural network 190 inside of the inspection control device 52. This configuration is, however, not essential. As long as at least the AI model 200 (the learned neural network 190) is stored in the storage unit 187, a modified configuration may omit the learning unit 176. Accordingly, this configuration may perform learning of the neural network 190 outside of the inspection control device 52 and may store the results of learning into the storage unit 187.

(h) In the configuration of the embodiments described above, the pocket portion inspection device 21 is placed in the PTP packaging machine (blister packing machine) 11 that performs up to filling of the contents such as the tablets 5. This configuration is, however, not essential. For example, in a production line that separately performs manufacture of the container film 3 and packaging of the contents, in a modified configuration, the pocket portion inspection device 21 may be provided in a manufacturing apparatus of the container film 3. In another modified configuration, an offline inspection device configured to perform an inspection of the container film 3 with the pocket portions 2 formed therein may be provided separately from a manufacturing apparatus of the container film 3.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 2a . . . bottom portion, 2b . . . side portion, 2c . . . corner portion, 3 . . . container film, 4 . . . cover film, 5 . . . tablet, 11 . . . PTP packaging machine, 15 . . . heating device, 16 . . . pocket portion forming device, 21 . . . pocket portion inspection device, 50 . . . illumination device, 51 . . . camera, 52 . . . inspection control device, 176 . . . learning unit, 177 . . . inspection performing unit, 190 . . . neural network, 200 . . . AI model, K (K1, K2) . . . shading pattern

What is claimed is:

1. An inspection device that inspects a formation state of a pocket portion formed in a container film of a blister pack, the inspection device comprising:

an illumination device that irradiates a container film including the pocket portion with a predetermined electromagnetic wave;

an imaging device that is disposed on an opposite side to the illumination device across the container film and that takes an image of at least the electromagnetic wave transmitted through a bottom portion of the pocket portion and obtains image data;

a central processing unit (CPU) that extracts, based on the image data, shading pattern data corresponding to a shading pattern occurring in the bottom portion of the pocket portion by irradiation with the electromagnetic wave, wherein the extracted shading pattern data indicate a thickness of the bottom portion; and a storage that stores a neural network and a model, wherein the model is generated by learning of the neural network using, as learning data, only shading pattern data of a pocket portion without any formation defect among the extracted shading pattern data, the neural network has an encoding portion and a decoding portion, the encoding portion extracting a characteristic amount from input shading pattern data and the decoding portion creating reconstructed shading pattern data from the characteristic amount, and the CPU is configured to:
obtain the reconstructed shading pattern data that is reconstructed by inputting the extracted shading pattern data into the model,
compare the extracted shading pattern data with the reconstructed shading pattern data and update the neural network such that a difference as a comparison result is smaller than a predetermined reference value,
determine, based on a correlation between the thickness of the bottom portion and a thickness of a side portion of the pocket portion, whether the thickness of the side portion is within a predetermined range, and
determine, based on the comparison result and a determination result, whether a quality of a formation state of at least the side portion of the pocket portion is good.

2. The inspection device according to claim 1, wherein the container film is made of a resin film material having translucency, and
the illumination device radiates ultraviolet light as the electromagnetic wave.

3. The inspection device according to claim 1, wherein the electromagnetic wave has a wavelength that provides a transmittance of the container film of not lower than 15 percent and not higher than 60 percent.

4. The inspection device according to claim 2, wherein the electromagnetic wave has a wavelength that provides a transmittance of the container film of not lower than 15 percent and not higher than 60 percent.

5. The inspection device according to claim 1, wherein the pocket portion is thermally formed in the container film that is flat.

6. The inspection device according to claim 2, wherein the pocket portion is thermally formed in the container film that is flat.

7. The inspection device according to claim 3, wherein the pocket portion is thermally formed in the container film that is flat.

8. The inspection device according to claim 4, wherein the pocket portion is thermally formed in the container film that is flat.

9. A blister packing machine, comprising the inspection device according to claim 1.

10. A blister packing machine, comprising the inspection device according to claim 2.

11. A blister packing machine, comprising the inspection device according to claim 3.

12. A blister packing machine, comprising the inspection device according to claim 4.

13. A blister packing machine, comprising the inspection device according to claim 5.

14. A blister packing machine, comprising the inspection device according to claim 6.

15. A blister packing machine, comprising the inspection device according to claim 7.

16. A blister packing machine, comprising the inspection device according to claim 8.

17. A method of manufacturing a blister pack, the method comprising:
a pocket portion forming process of forming a pocket portion in a belt-shaped container film;
a filling process of filling a content into the pocket portion;
a mounting process of mounting a belt-shaped cover film to the container film with the pocket portion filled with the content to close the pocket portion and obtaining a belt-shaped body;
a separation process of separating the blister pack from the belt-shaped body; and
an inspection process of inspecting a formation state of the pocket portion in the blister pack, wherein
the inspection process comprises:
an irradiation process of irradiating the container film including the pocket portion with a predetermined electromagnetic wave;
an imaging process of taking an image of at least the electromagnetic wave transmitted through a bottom portion of the pocket portion and obtaining image data;
a shading pattern extraction process of extracting, based on the image data, shading pattern data corresponding to a shading pattern occurring in the bottom portion of the pocket portion by irradiation with the electromagnetic wave, wherein the extracted shading pattern data indicate a thickness of the bottom portion;
a reconstructed data obtaining process of obtaining reconstructed shading pattern data that is reconstructed by inputting the extracted shading pattern data into a model, wherein
the model is generated by learning of a neural network using, as learning data, only shading pattern data of a pocket portion without any formation defect among the extracted shading pattern data, and
the neural network has an encoding portion and a decoding portion, the encoding portion extracting a characteristic amount from input shading pattern data and the decoding portion creating the reconstructed shading pattern data from the characteristic amount;
a comparison and update process of comparing the extracted shading pattern data with the reconstructed shading pattern data and updating the neural network such that a difference as a comparison result is smaller than a predetermined reference value;
a thickness determining process of determining, based on a correlation between the thickness of the bottom portion and a thickness of a side portion of the pocket portion, whether the thickness of the side portion is within a predetermined range; and
a good/poor quality determining process of determining, based on the comparison result and a determination result, whether a quality of a formation state of at least the side portion of the pocket portion is good.

* * * * *